US012263508B2

(12) United States Patent
Kavchok et al.

(10) Patent No.: US 12,263,508 B2
(45) Date of Patent: Apr. 1, 2025

(54) SPRAY WAND

(71) Applicant: W.M. BARR & COMPANY, INC., Memphis, TN (US)

(72) Inventors: Kevin Andrew Kavchok, Charlotte, NC (US); Matthew Michael Petkus, Memphis, TN (US); Alana Byrd, Memphis, TN (US); Rachel Ann Farmer, Memphis, TN (US)

(73) Assignee: W.M. BARR & COMPANY, INC., Memphis, TN (US)

( * ) Notice: Subject to any disclaimer, the term of this patent is extended or adjusted under 35 U.S.C. 154(b) by 0 days.

(21) Appl. No.: 18/385,620

(22) Filed: Oct. 31, 2023

(65) Prior Publication Data

US 2024/0058846 A1 Feb. 22, 2024

Related U.S. Application Data

(63) Continuation of application No. 17/354,783, filed on Jun. 22, 2021, now Pat. No. 11,833,553, which is a continuation-in-part of application No. 17/124,186, filed on Dec. 16, 2020, now Pat. No. 11,679,404.

(60) Provisional application No. 63/108,597, filed on Nov. 2, 2020, provisional application No. 62/951,376, filed on Dec. 20, 2019.

(51) Int. Cl.
*B08B 3/08* (2006.01)
*B05B 7/04* (2006.01)
*B08B 3/02* (2006.01)

(52) U.S. Cl.
CPC .................. *B08B 3/08* (2013.01); *B05B 7/04* (2013.01); *B08B 3/026* (2013.01); *B08B 2203/0217* (2013.01)

(58) Field of Classification Search
CPC ......... B05B 15/658; B05B 15/58; B05B 1/06; B05B 1/3026; B05B 1/3494; B05B 7/2462; B05B 1/3415; B05B 1/704; B08B 3/08; B08B 3/026; B08B 2203/0217
USPC ....... 239/310, 315, 316, 317, 525, 530, 532, 239/581.1
See application file for complete search history.

(56) References Cited

U.S. PATENT DOCUMENTS 2,225,759 A 12/1910 Strout
1,469,065 A 9/1923 D'arcy
1,743,370 A 1/1930 Messmer
(Continued)

FOREIGN PATENT DOCUMENTS

DE 6807437 U 10/1976
DE 8814667 U1 5/1989
(Continued)

OTHER PUBLICATIONS

Notice of Allowance issued for U.S. Appl. No. 18/204,629 mailed May 31, 2024 (10 pages).
(Continued)

*Primary Examiner* — Steven J Ganey
(74) *Attorney, Agent, or Firm* — Shumaker, Loop & Kendrick, LLP

(57) ABSTRACT

A spray wand for use with a chemical or chemical formulation in solid form. The wand hose end has a wand hose end valve for control of water flow from a hose. A refill cartridge having a swirl chamber may be attached to the hollow tube. The refill cartridge has at least one nub, indent and/or external channel or groove on its external surface.

28 Claims, 42 Drawing Sheets

(56) References Cited

U.S. PATENT DOCUMENTS

| | | | |
|---|---|---|---|
| 2,064,178 | A | 12/1935 | Pickard |
| 2,215,375 | A | 9/1940 | Ortman |
| 2,218,790 | A | 10/1940 | Gifford |
| 2,338,615 | A | 1/1944 | Armstrong et al. |
| 3,134,545 | A * | 5/1964 | Armond .................. E03C 1/046 239/443 |
| 3,770,205 | A | 11/1973 | Proctor et al. |
| 4,112,916 | A | 9/1978 | Guibert |
| 4,634,053 | A | 1/1987 | Herzfeld et al. |
| 4,812,070 | A | 3/1989 | Marty |
| 5,906,316 | A | 5/1999 | Gatzemeyer et al. |
| 6,618,977 | B1 * | 9/2003 | Curro ................. A01K 67/0332 239/302 |
| 6,814,306 | B1 * | 11/2004 | Okubo ...................... B05B 3/04 239/315 |
| 6,948,663 | B1 | 9/2005 | Graham et al. |
| 7,124,962 | B1 | 10/2006 | Fryan et al. |
| 7,410,105 | B2 | 8/2008 | Horstman et al. |
| 8,403,241 | B2 | 3/2013 | Jung |
| 9,278,801 | B2 * | 3/2016 | Gruder ............... B65D 85/8055 |
| 9,533,331 | B1 | 1/2017 | Kane et al. |
| 10,221,546 | B2 | 3/2019 | Mercieca |
| 2003/0182839 | A1 | 10/2003 | Curro |
| 2004/0082491 | A1 | 4/2004 | Olson et al. |
| 2005/0161530 | A1 * | 7/2005 | Bartsch ................. B05B 7/2443 239/315 |
| 2010/0320157 | A1 | 12/2010 | Schnitzler |
| 2011/0089253 | A1 | 4/2011 | Moorman |
| 2012/0228800 | A1 | 9/2012 | Arora et al. |
| 2013/0026250 | A1 | 1/2013 | Burt et al. |
| 2013/0109609 | A1 | 5/2013 | Smith et al. |
| 2013/0214061 | A1 | 8/2013 | Maclean-Blevins |
| 2015/0351332 | A1 | 12/2015 | Janku et al. |
| 2018/0371727 | A1 * | 12/2018 | Mercieca ................ E03C 1/046 |
| 2021/0187536 | A1 | 6/2021 | Kavchok et al. |
| 2021/0187560 | A1 | 6/2021 | Petkus et al. |

FOREIGN PATENT DOCUMENTS

| | | | |
|---|---|---|---|
| DE | 10320042 | A1 | 6/2004 |
| DE | 202017000595 | U1 | 5/2018 |
| DE | 102017001012 | A1 | 8/2018 |
| EP | 0120331 | A1 | 10/1984 |
| EP | 0819474 | A2 | 1/1998 |
| EP | 1518607 | A1 | 3/2005 |
| EP | 3326448 | B1 | 5/2018 |
| EP | 3590323 | A1 | 1/2020 |
| FR | 2906485 | A1 | 4/2008 |
| WO | 2013083929 | A1 | 6/2013 |
| WO | 2020046114 | A1 | 3/2020 |
| WO | 2021127219 | A1 | 6/2021 |

OTHER PUBLICATIONS

Supplementary European Search Report of corresponding European Application No. 20901173.3; dated Apr. 10, 2024; (16 pages).

International Preliminary Report on Patentability of corresponding International Application No. PCT/US2022/033808; dated Sep. 28, 2022; (6 pages).

International Preliminary Report on Patentability of corresponding International Application No. PCT/US2020/065560; dated Mar. 15, 2021; (8 pages).

International Preliminary Report on Patentability of corresponding International Application No. PCT/US2020/065671; dated May 7, 2021; (13 pages).

European Search Report Issued in EP App No. 23188523.7 on Jun. 19, 2024 (10 Pages).

* cited by examiner

SPRAY WAND

CROSS-REFERENCE TO RELATED APPLICATIONS

This application is a continuation application which claims priority from U.S. utility patent application Ser. No. 17/354,783, filed on Jun. 22, 2021, which claims priority as a continuation-in-part application from T U.S. utility patent application Ser. No. 17/124,186, filed on Dec. 16, 2020, which claims priority from U.S. provisional patent application Ser. No. 62/951,376, filed on Dec. 20, 2019, and from U.S. provisional patent application Ser. No. 63/108,597, filed on Nov. 2, 2020, in the United States Patent and Trademark Office. The disclosures of which are incorporated herein by reference in their entireties.

FIELD OF THE INVENTION

The present invention relates to a spray wand, more particularly to a spray wand for use with a chemical or chemical formulation in solid form.

BACKGROUND OF THE INVENTION

Outdoor cleaning requires applying a significant amount of cleaner over large surface areas, such as house siding, roofs, decks, patios, and automobiles. The industry standard solution for addressing such cleaning activities are liquid based hose-end type products. These products typically contain a bottom reservoir where a concentrated liquid chemistry solution is stored. The final cleaning solution is created when a hose is attached to the nozzle of the device and water passes through the hose. Liquid concentrate is drawn up a dip tube and mixed with the water passing through the nozzle of the device. The diluted chemistry is then dispensed onto the surface to be cleaned.

Some problems with standard hose-end devices are that they tend to be very heavy, bulky, and ergonomically displeasing to use. Due to the location where the hose hooks into the device, the range of motion when cleaning is greatly hindered, and the added weight from the liquid concentrate creates the need for users to often use two hands when operating the device. Also, water flow restrictors tend to be used to ensure the correct dilution ratio is met. The use of these water flow restrictors can greatly diminish the overall reach of the diluted spray.

Thus, there is a need for a hose-end type product that is lighter and designed for an optimal ergonomic outdoor cleaning experience.

SUMMARY OF THE INVENTION

The spray wand device of present invention solves the above referenced problems, including providing a device which is ergonomically superior to current hose-end products on the market and which can easily be held with one hand when in operation. The spray wand device of the present invention can dilute concentrated solid chemistry consistently to deliver an output cleaning solution that contains a pesticidal active to kill microorganisms and be registered with the EPA.

The device of the present invention can be used to achieve the proper dilution of the solid chemistry to yield the optimal cleaning solution. Ensuring consistent and accurate dilution of solid chemistry to water is not only important for product longevity to clean large outdoor surface areas, but is even more important when ensuring the correct dosage of a pesticidal active (i.e. Calcium Hypochlorite) when killing microorganisms such as mold. Products delivering pesticidal actives must be qualified through GLP (Good Laboratory Practice) testing and registered with the EPA (Environmental Protection Agency). Such GLP testing requires a specific range of pesticidal active concentration to be defined and tested against the killing of the intended microorganism to ensure efficacy of the final cleaning solution. A device delivering the final cleaning solution needs to consistently deliver the proper dilution ratio of pesticidal actives to ensure it is the same chemistry tested in GLP testing to be compliant with the EPA.

The invention also allows water to pass over the solid chemistry in such a way that the output stream from the device has further spray reach than current hose-end products on the market.

The device of the present invention allows connection of a hose in such a way that the hose does not hinder range of motion when cleaning, and the device is light enough in weight so that the device can easily be held with only one hand when in operation. In order to achieve lighter weight, the device operates using chemistries of solid composition. This enables less weight to be used in the device since chemistries of solid composition are more concentrated than their liquid counterparts.

In an embodiment of the invention, the spray wand comprises a spray wand body having a hollow tube with an angled wand spray end, an optional spray end selector attached to the angled wand spray end, a wand hose end screen inserted into or otherwise attached to the hollow tube of the spray wand body, and a wand hose end connected to the spray wand body. The wand hose end may have a wand hose end valve for control of water flow from a hose.

In an embodiment of the invention, the spray wand comprises a spray wand body having a hollow tube with an angled wand spray end, an optional spray end selector attached to the angled wand spray end, a cartridge for attachment to the hollow tube, and a wand hose end connected to the spray wand body having the cartridge. The wand hose end may have a wand hose end valve for control of water flow from a hose.

In an embodiment of the invention, the spray wand incorporates a housing, or cartridge-type housing, where the solid chemistry is stored and does not come into direct contact with the end-user. The separate housing minimizes the overall exposure risk to the consumer.

In an embodiment of the invention, a cartridge comprises a swirl chamber.

In an embodiment of the invention, the spray wand comprises: a spray wand body having a hollow tube with a wand spray end; a refill cartridge assembly for insertion into the hollow tube, wherein the spray wand body is configured for receiving the refill cartridge assembly inside of the spray wand body; and a wand hose end having a handle connected to the spray wand body, wherein the refill cartridge assembly is comprised of a refill cartridge having a distal end and a proximal end and at least one nub within the refill cartridge at the proximal end, and a swirl chamber attached to the nubs on the proximal end of the refill cartridge.

In an embodiment of the invention, a refill cartridge having a proximal end and a distal end, and having at least one nub at the proximal end of the refill cartridge.

In an embodiment of the invention, a refill cartridge having an indent on its exterior surface and nestable with one or more refill cartridges.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

Figure 1:
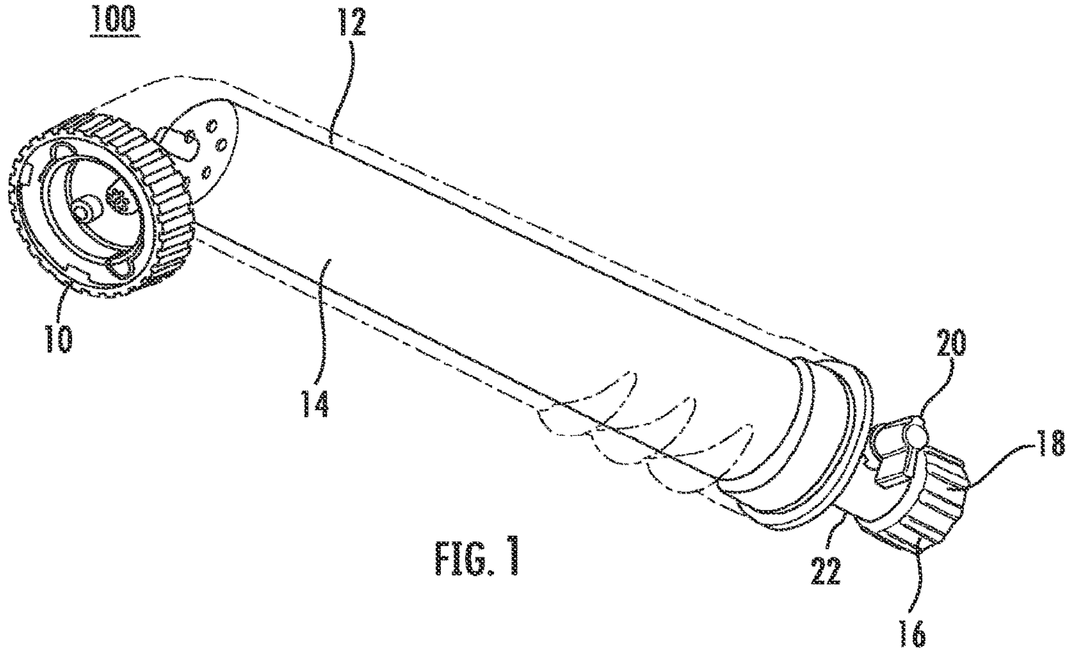
FIG. 1 is an isometric view of a spray wand with a refill cartridge assembly in accordance with the present invention.

In an embodiment of the invention, a spray wand 100 is provided. Spray wand 100 comprises a spray nozzle 10, a non-disposable spray body 12 shown in a shape of a tube, and a replaceable refill cartridge assembly 14 inside of spray body 12. Referring to the figures, FIG. 1 is an isometric view of spray wand 100 in accordance with the present invention. Spray wand 100 comprises non-disposable spray body 12 and replaceable refill cartridge assembly 14 having a refill cartridge that holds a chemical or chemical formulation in solid form, also referred to herein as a solid chemistry. At a shut-off or hose end 16 of spray wand 100, a user connects a garden hose with a rotating or swivel hose nut to a hose nut 18 of hose end 16. The user can open and close the fluid flow with a shut-off valve 20. Shut-off valve 20 is located on a handle 22 of spray wand 100 which allows the user, for example, to turn off water in the middle of use at handle 22 and detach the spray body to replace the solid chemistry or cartridge.

Water passes through refill cartridge assembly 14 in a tangential swirling manner that tumbles or flows through the solid chemistry, maximizing exposure to the solid chemistry resulting in higher applied chemistry concentration. The chemistry fluid mix is dispensed at distal nozzle 10. The user can rotate nozzle 10 to select a desired spray setting. Although two settings are shown, additional spray settings may be present and are within the scope of the present invention. Nozzle 10 preferably has one or more detented positions, more preferably four detented positions.

Figure 2:
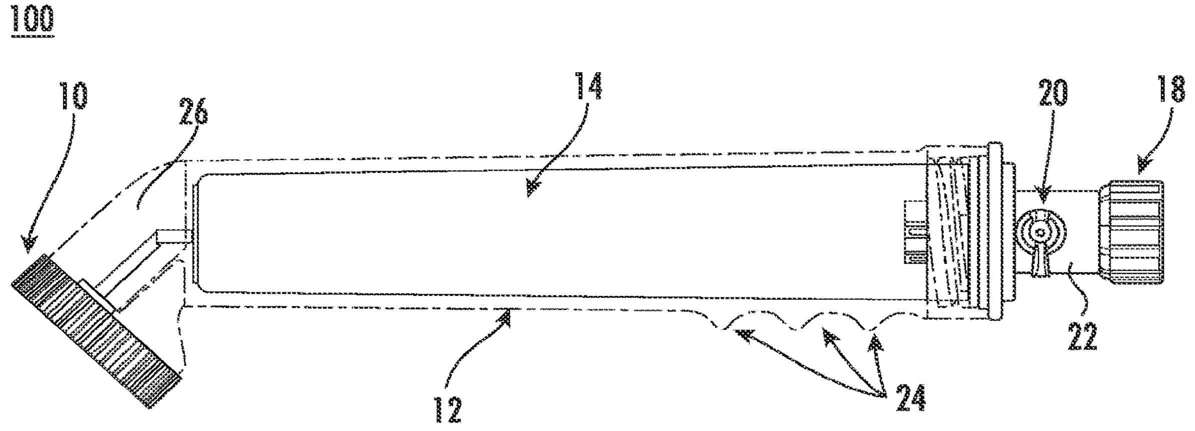
FIG. 2 is a side view of the spray wand with the refill cartridge assembly of FIG. 1.

FIG. 2 is a side view of spray wand 100 of FIG. 1. In FIG. 2, optional molded in grip features 24 are shown on spray body 12. By having grips 24 on spray body 12 versus further down past shutoff end 16, torque on an arm of a user is minimized, thus reducing user fatigue. FIG. 2 illustrates that spray wand 100 comprises spray body 12. Spray body 12 is comprised of a hollow tube, preferably transparent, with an angled wand spray end 26 attached to spray end selector or nozzle 10. FIG. 2 also illustrates shut-off valve 20 for control of water flow from a hose and hose nut 18 for connection to the hose. Spray wand 100 is particularly suited for cleaning outdoor hard surfaces.

The spray body in a form of a hollow tube is configured for receiving refill cartridge assembly 14 having a refill cartridge containing a solid chemistry. The hollow tube and/or refill cartridge may have an indicator or a marking to alert a user when the solid chemistry should be replaced to achieve a desired concentration level. The solid chemistry is preferably for cleaning, mold removal, or mildew removal purposes, among others. Examples of solid chemistry forms include, but are not limited to, pellets, tablets, or some other form of solid chemistry. Among the benefits of the solid chemistry is that the solid chemistry lasts for an extended period of time during use, makes the spray wand lighter in weight for an end user, no water volume or weight for shipping since solid active, and visibility of solid chemistry makes it possible to watch as it is used and know when to replace. Spray wand 100 of the present invention preferably contains a chemical or chemical formulation in a solid form such as a solid chlorine bleach. Non-limiting examples of chemical or chemical formulations include, but are not limited to, washing soda, baking soda, solid surfactants, calcium hypochlorite, sodium hypochlorite, citric acid, sodium sulfate, urea, quaternary amines, herbicides, insecticides, pesticides, fertilizers, and a combination thereof. Preferably, the chemical is or chemical formulation includes calcium hypochlorite. Calcium hypochlorite contains over 70% active available chlorine and has a long shelf like when stored appropriately.

Due to the geometry of spray wand 100, water passes directly over the solid chemistry and out of the nozzle of the spray wand. The spray wand of the present invention generates higher water pressures and thus further reach of spray out of the spray wand.

Spray wand 100 of the present invention has versatility in range of motion and is lighter in weight. Since the spray wand can be used with one hand, and a hose is connected into the handle of the spray wand, the spray wand can easily be adjusted to clean underneath cars or decks or other hard to reach places. The spray wand can be used one-handed making it easier for a user to lift his/her arm to get an even further reach, unlike products requiring two hands to use.

Figure 3:
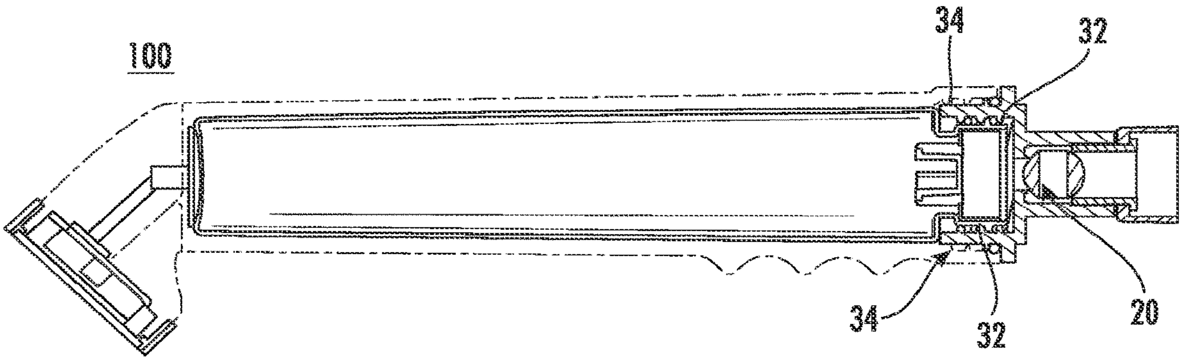
FIG. 3 is a cross-sectional view of the spray wand with the refill cartridge assembly.

FIG. 3 is a cross-sectional view of spray wand 100 with refill cartridge assembly 14. As shown in FIG. 3, external threads on the refill cartridge thread into internal threads 32 of the handle of the shut-off end of the spray wand. Once the refill cartridge is secure, the user threads the refill cartridge/shut-off assembly into threads 34 of the spray body. At this point the user rotates the shut-off valve 20 from the closed position to the open position and dispenses product.

Figure 4:
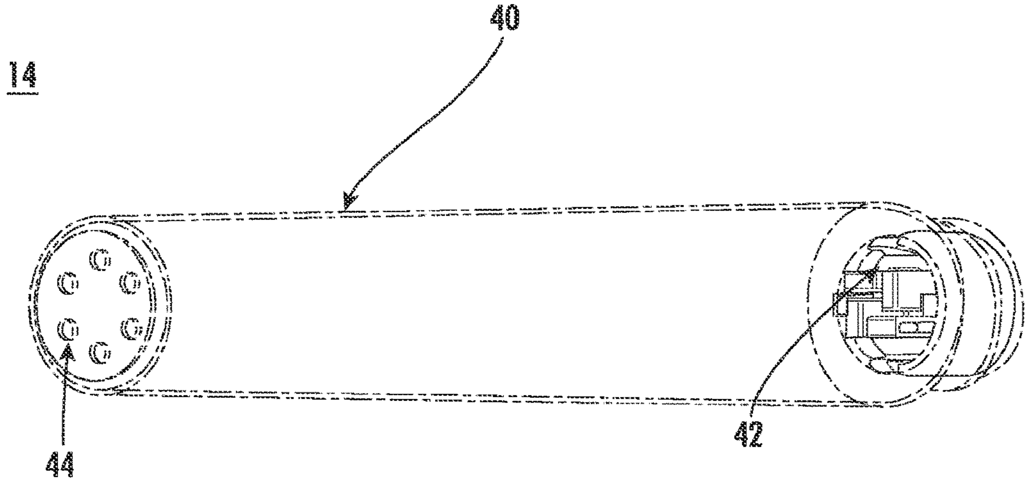
FIG. 4 illustrates the refill cartridge assembly.

FIG. 4 illustrates refill cartridge assembly 14. The refill cartridge assembly is comprised of a tubular refill cartridge 40, preferably transparent, and a swirl chamber 42 snapped into or otherwise attached or affixed to the proximal end of tubular refill cartridge 40. Refill cartridge 40 is hollow but is to be filled to contain the solid chemistry. Preferably, the tubular refill cartridge 40 is prefilled with the solid chemistry. Water enters the proximal end, travels through swirl chamber 42, the water tangentially tumbles or flows through the solid chemistry present and exits through orifices 44 on the distal end of refill cartridge 40.

Figure 5:
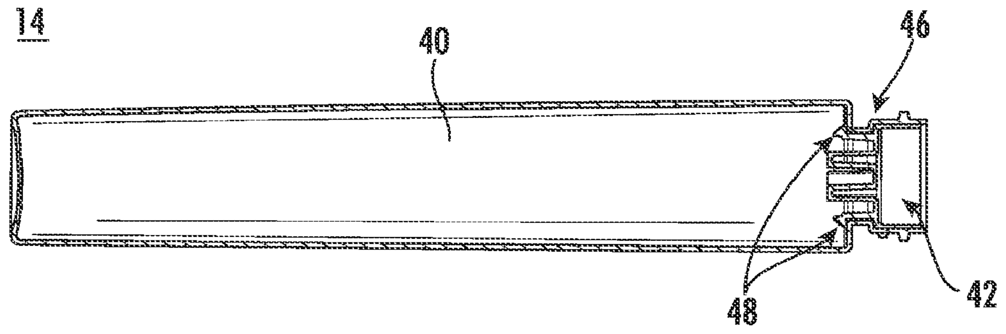
FIG. 5 is a cross-sectional view of the refill cartridge assembly.

FIG. 5 is a cross-sectional view of refill cartridge assembly 14. FIG. 5 illustrates how swirl chamber 42 is positioned within the refill cartridge. Swirl chamber 42 is inserted or pushed into refill cartridge 40 until swirl chamber 42 bottoms out on a shoulder(s) 46 of refill cartridge 40. Prongs or tabs 48 extending as part of swirl chamber 42 provide a one-way snap feature to engage with refill cartridge 40 preventing removal. It is also conceived that the swirl chamber could be attached to the refill cartridge using a threaded connection such as with a child resistant ratchet feature. The swirl chamber may also be attached by being chemically adhered or welded to the refill cartridge.

Spray wand 100 by use of swirl chamber 42 creates turbulence and/or a cyclone effect with water flow within the tubular body and re-directs the water flow over the solid chemistry so that the solid chemistry does not dilute too quickly and achieves chemical concentrations needed for effectiveness. Changing the refill cartridge is used to meter the water flow to achieve an appropriate dilution of the solid chemistry. This is important for certain chemical products, such as products used to kill mold.

The advantage to the user with a transparent refill cartridge is that visibility allows the user to see the solid chemistry dissolve and to also know when to replace the solid chemistry and/or refill cartridge. The refill cartridge top has holes small enough to keep beads from blocking an exit orifice, but yet water moving through the exit orifice uninterrupted. Another benefit is the user need not touch the solid chemistry which can be toxic or is in concentrated solid form. The screw in/threaded connection of the refill cartridge assembly to the handle of the spray wand allows for water to pass through the refill cartridge for proper dilution of solid chemistry.

Figure 6:
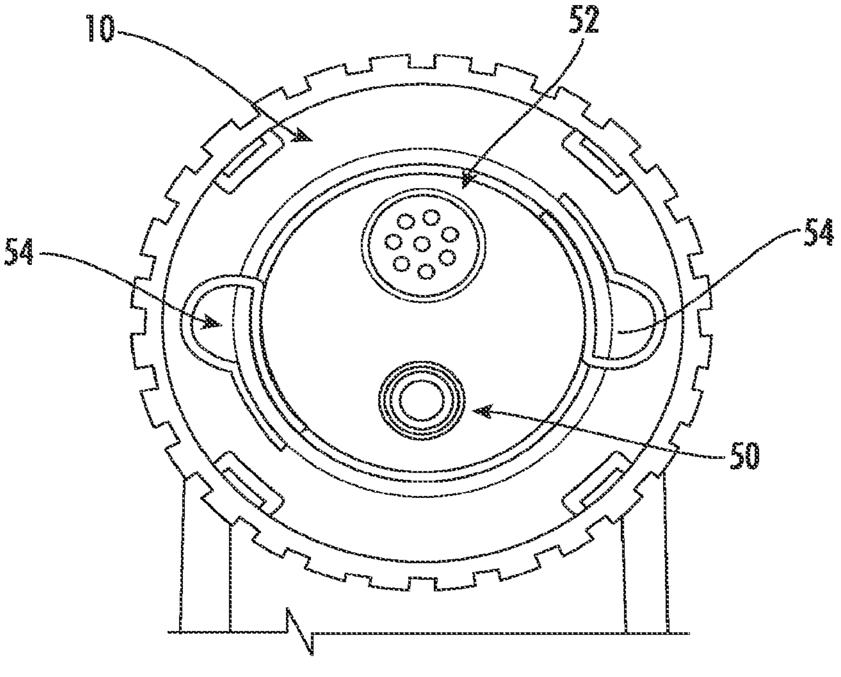
FIG. 6 is a close-up view of the spray nozzle.
Figure 7:
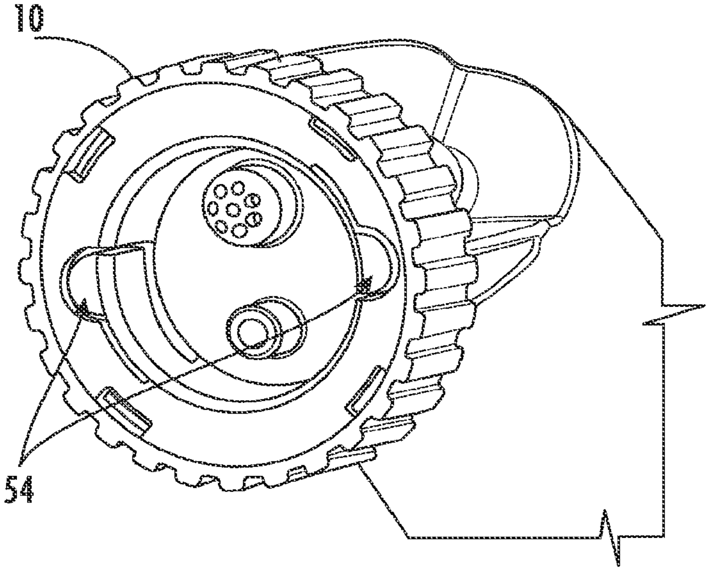
FIG. 7 is an isometric view of the spray nozzle.
Figure 8:
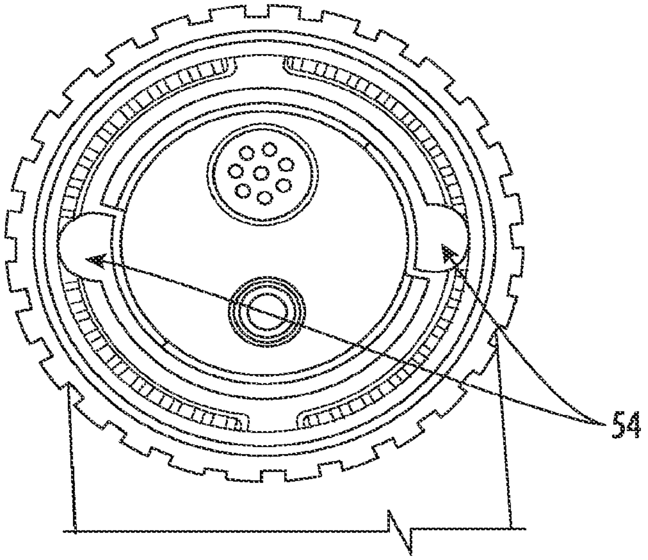
FIG. 8 is a cross-sectional view of the spray nozzle.

FIG. 6 is a close-up view of spray nozzle 10. Spray nozzle 10 preferably has at least two user selected settings, "stream" or "spray." The "stream" setting has a stream orifice 50. The "spray" setting has a spray orifice 52 in spray nozzle 10. The user can rotate the nozzle to make the spray selection. It is conceived that more than two settings are possible which may include a fan spray setting, for example. In FIG. 6, one or more detents 54 are features that are shown to cue the user and hold the spray nozzle into position. FIG. 7 is an isometric view of spray nozzle 10. FIG. 8 is a cross-sectional view of spray nozzle 10. FIG. 8 illustrates how detents 54 of the spray nozzle 10 interface with one or more detent pockets 60 (shown in FIG. 11) in the spray body to hold the spray nozzle into rotational position when in use.

Figure 9:
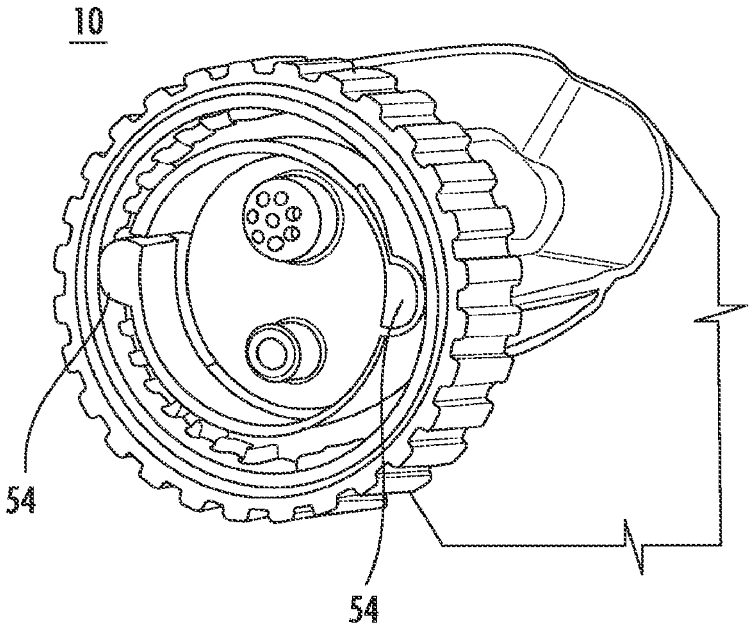
FIG. 9 is a cross sectional-isometric view of the spray nozzle.

FIG. 9 is a cross sectional-isometric view of spray nozzle 10. FIG. 9 provides another perspective on part interaction. When the user rotates spray nozzle 10, the spray nozzle detents 54 flex and snap into the next set of detent pockets 60.

Figure 10:
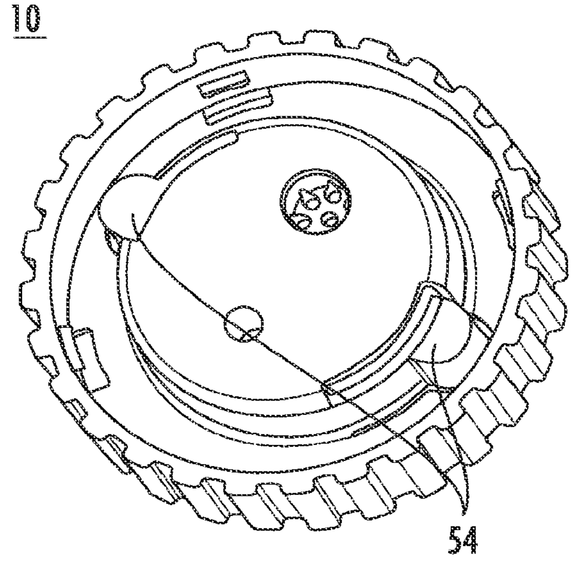
FIG. 10 is an internal view of the spray nozzle.

FIG. 10 illustrates molded in detents 54. Detents 54 in the spray nozzle can flex in and out to allow the user desired rotational movement.

Figure 11:
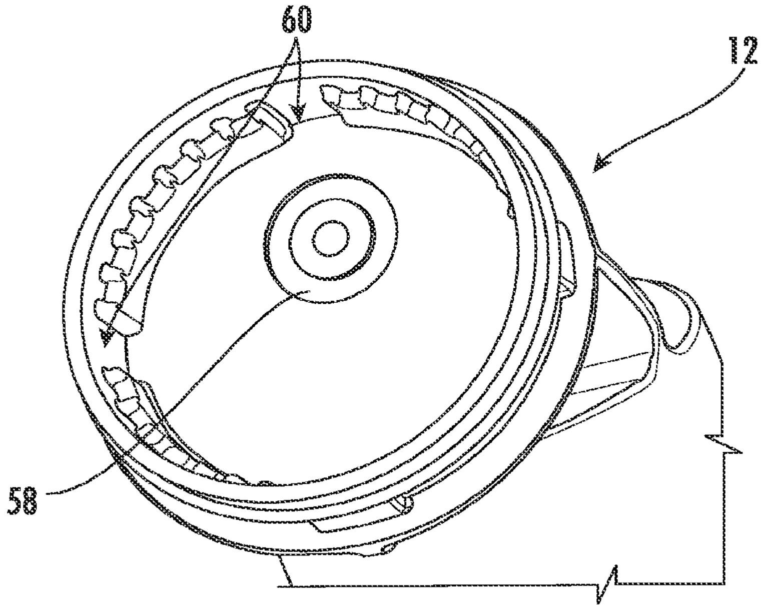
FIG. 11 is an end view of the spray body.

FIG. 11 illustrates mating spray body detent pockets 60 with which the spray nozzle detents 54 interact. The number of possible positions for the spray nozzle may vary. For example, FIG. 11 shows four positions for the spray nozzle. The user can select a spray pattern. When in a selected spray pattern, molded spray nozzle detents 54 fall into, and position is retained by, detent pockets 60 in spray body 12. It is contemplated that more than two settings may be present, which may include a fan spray setting. FIG. 11 also illustrates a recess 58 where an O-ring will be located.

Figure 12:
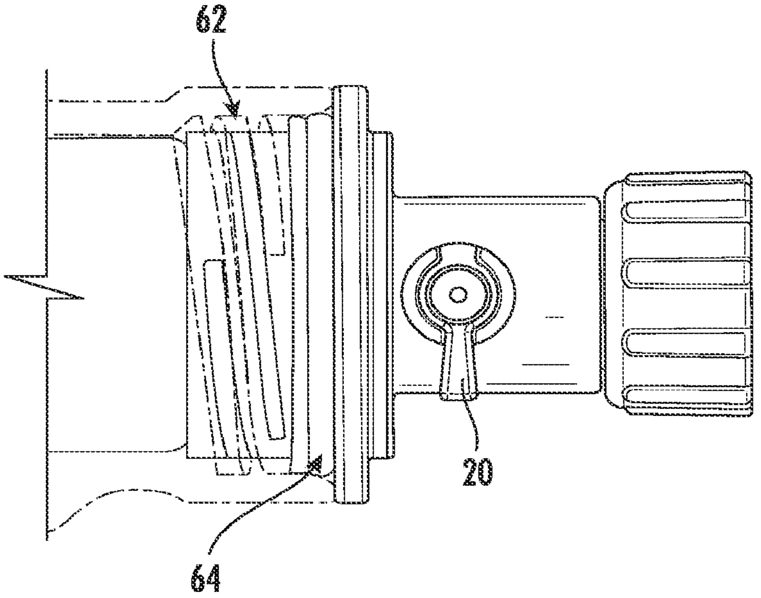
FIG. 12 illustrates the hose and refill connector.

FIG. 12 illustrates the hose end and refill connector. FIG. 12 illustrates a close-up view showing a threaded attachment 62 between shut-off valve 20 and the spray body. FIG. 12 also shows an O-ring 64 that provides a fluid seal between the spray body and the shut-off valve.

Figure 13:
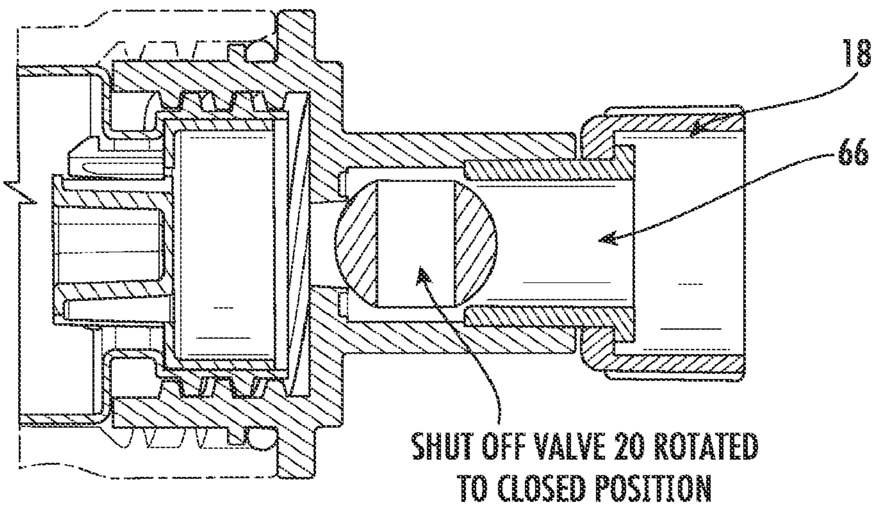
FIG. 13 is a cross-sectional view of the hose and refill connector.

FIG. 13 is a cross-sectional view of the connect between the hose end and the refill cartridge. FIG. 13 shows shut-off valve 20 rotated to the closed position. FIG. 13 also illustrates hose nut 18 attached to a hose nut retainer 66.

Figure 14:
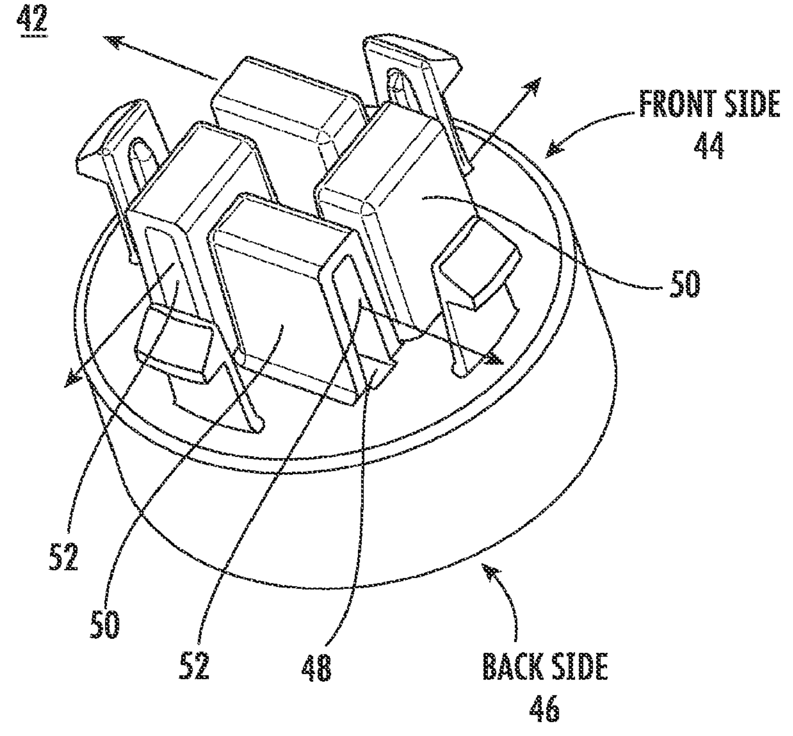
FIG. 14 illustrates a swirl chamber.
Figure 15A:
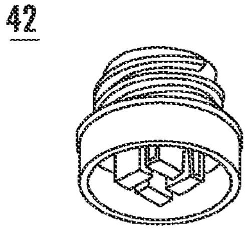
FIGS. 15A-E illustrate various views of the swirl chamber.
Figure 15B:
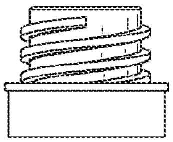
Figure 15C:
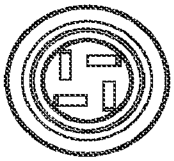
Figure 15D:
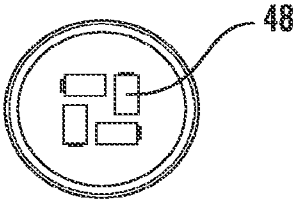
Figure 15E:
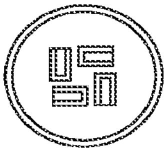
Figure 16A:
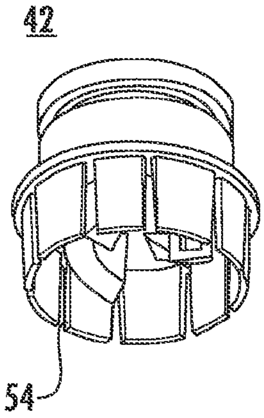
FIGS. 16A-D illustrate various views of a ramped swirl chamber.
Figure 16B:
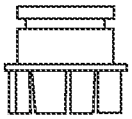
Figure 16C:
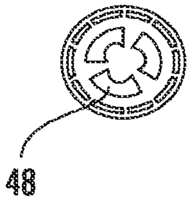
Figure 16D:
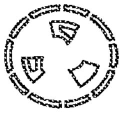

FIG. 14 illustrates swirl chamber 42. Swirl chamber 42, having a front side 44 and a back side 46, creates a fluid tumble within the refill cartridge. Without the swirling and tumbling of water, the water would directly pass through the refill cartridge and result in a lower concentration of chemistry. Water enters in a linear fashion on back side 46 of swirl chamber 42. The swirl chamber causes a directional change and the fluid exits in a tangential manner. Potential swirl chamber configurations may include one or more tangential channels 48, preferably two or more tangential channels 48. Channels 48 may be of various geometric shapes such as rectangular or helical. Providing spacing between channels results in greater tangential forces, however, it may or may not result in greater concentration. The swirl chamber has one or more raised projections 50 having fluid exit windows 52, and the fluid exit windows may be rectangular, square, round, or another shape. As illustrated, rectangular is shown. The swirl chamber may have various configurations. Considerations for selecting a configuration include, but are not limited to, suitability for an injection molding process, and cross-sectional flow area as to not restrict fluid flow. FIGS. 15A-E illustrate various views of the swirl chamber including illustrating channels 48.

During use, water passes through the swirl chamber and creates a swirl or vortex. The swirl chamber aids in preventing release of chemical too quickly or tapering off too fast. It is used to mix the water and dissolving chemical preferably at an even ratio.

As indicated above, swirl chamber 42 may have alternate configurations and still be within the scope of the present invention so long as the configuration creates a swirl or vortex of water when water passes through the swirl chamber. For example, water comes in as one stream and creates several streams in one direction to create swirl or cyclone effect.

It is within the scope of the invention that there may be alternate configurations of the swirl chamber. For example, the swirl chamber may be in a form of a ramped swirl chamber having one or more ramps as projections. FIGS. 16A-D illustrate various views of a ramped swirl chamber having one or more ramps 54.

Figure 17:
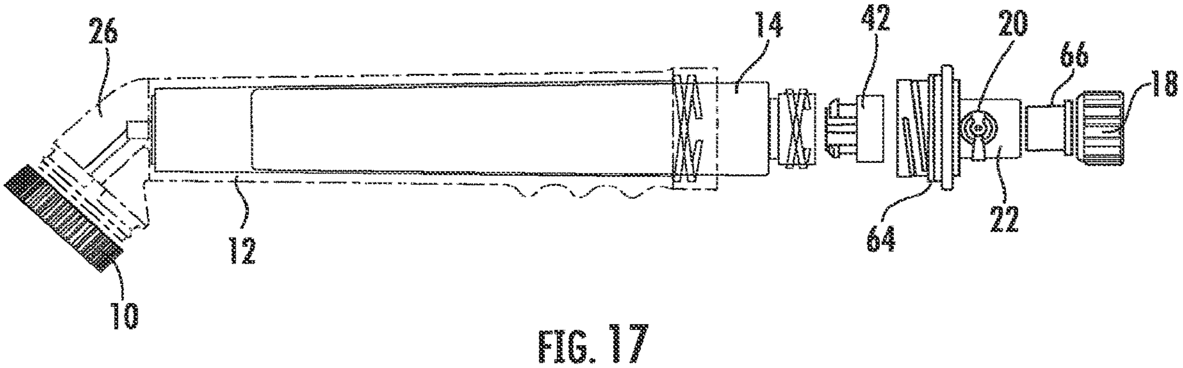
FIG. 17 is an exploded view of the spray wand with refill cartridge.

FIG. 17 is an exploded view of the spray wand with refill cartridge.

Figure 18:
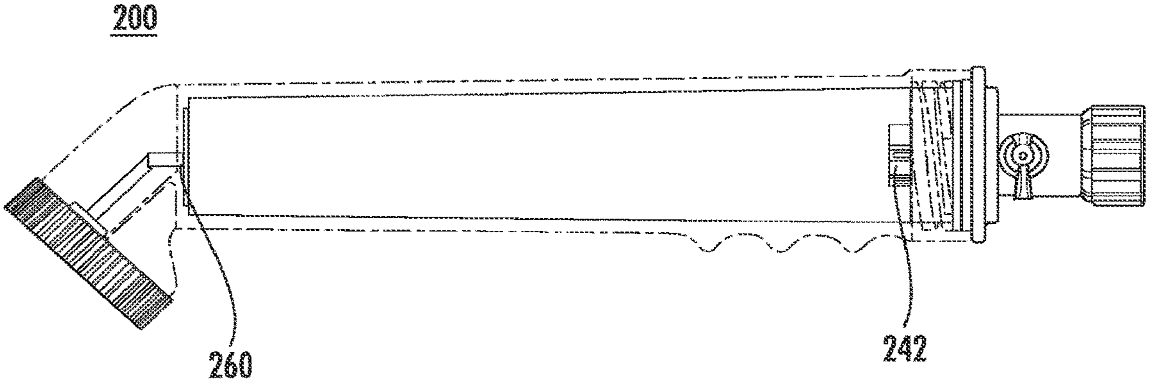
FIG. 18 is a side view of a spray wand with integrated screen and a swirl chamber.
Figure 19:
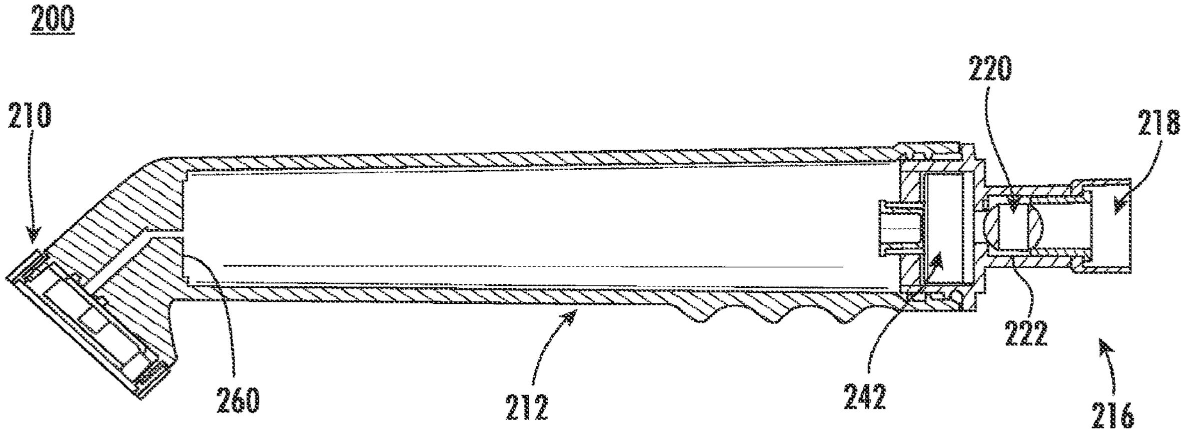
FIG. 19 is a cross-sectional side view of the spray wand with integrated screen and swirl chamber.

In another embodiment of the invention, referring to FIGS. 18 and 19, a spray wand 200 is provided with an integrated screen 260 and a swirl chamber 242, but without a refill cartridge. FIG. 18 is a side view of spray wand 200 with integrated screen 260 and a swirl chamber 242. Similar to the spray wand with refill cartridge, the spray wand with the integrated screen and the swirl chamber performs in the same manner but without a refill cartridge. In this embodiment, spray wand 200 with integrated screen 260 and swirl chamber 242 permanently fixes the screen into spray body 212 and permanently fixes swirl chamber 242 into shut-off end 216. The user loads spray body 212 with solid chemistry and screws the spray body to shut-off/hose end 216 to begin using. At the shut-off/hose end 216, the user connects a garden hose with a rotating hose nut. The user can open and close the fluid flow with a shut-off valve. Water passes through the shut-off/hose end in a tangential swirling manner that tumbles through the solid chemistry, maximizing exposure to the solid chemistry and resulting in a high applied chemistry concentration. The solid chemistry/fluid mix is dispensed at distal spray nozzle 210. The user can rotate spray nozzle 210 to select a desired spray setting. The nozzle has one or more detented positions, more preferably four detented positions.

FIG. 19 is a cross-sectional side view of the spray wand with integrated screen 260 and swirl chamber 242. In FIG. 19, there is not a refill cartridge. The swirl chamber is permanently fixed or glued in place.

Figure 20:
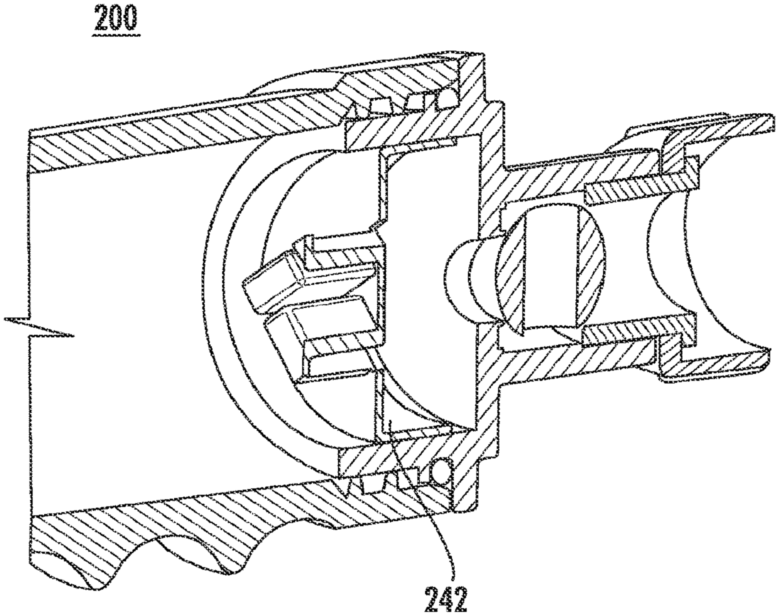
FIG. 20 is a cross-sectional, isometric view of the spray wand with swirl chamber.

FIG. 20 is a cross-sectional, isometric view of spray wand 200 with swirl chamber 242. FIG. 20 shows the direction of water flow, as water enters spray wand 200 and passes through swirl chamber 242.

Figure 21:
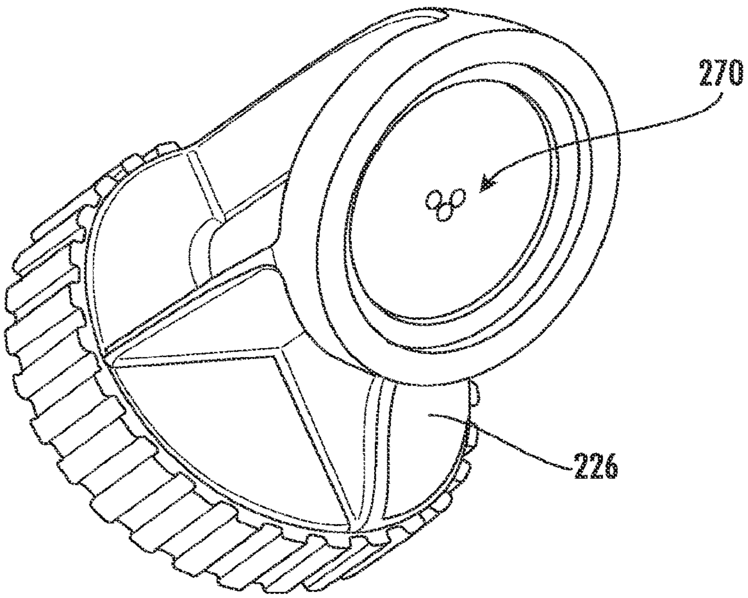
FIG. 21 is a section view of the spray body.

FIG. 21 is a section view of the angled wand spray end 226. As shown in FIG. 21, a group of smaller holes 270 is molded into the end of the spray body. This function prevents the chemistry from traveling down and blocking a single larger orifice. This function is provided by either a series of holes 270 or a permanent screen.

Figure 22:
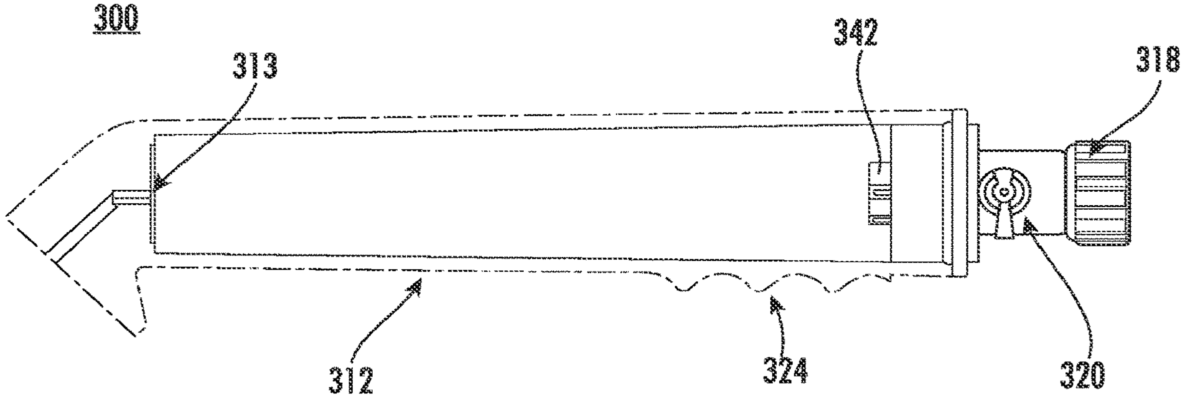
FIG. 22 is a side view of the disposable spray wand.

In another embodiment of the invention, a spray wand 300 that is disposable and non-refillable is provided. FIG. 22 is a side view of disposable spray wand 300 having grips 324. The spray wand has an integrated screen 313 and a swirl chamber 342. In this embodiment, the disposable spray wand eliminates the refill cartridge. Disposable spray wand 300 with integrated screen 313 and swirl chamber 342 permanently fixes the screen 313 into spray body 312 and permanently fixes swirl chamber 342 into the shut-off end.

Disposable spray wand 300 is to be prefilled with solid chemistry and spray body 312 is permanently fixed to the shut-off/hose end having shut-off valve 320.

At the shut-off/hose end, the user connects a garden hose with a non-rotating hose nut 318. The user can open and close the fluid flow with shut-off valve 320. Water passes through the shut-off/hose end and swirl chamber 342 in a tangential swirling manner that tumbles through the solid chemistry, maximizing exposure to the solid chemistry resulting in higher applied chemistry concentration. The solid chemistry/fluid mix is dispensed at the distal end of the spray body.

Figure 23:
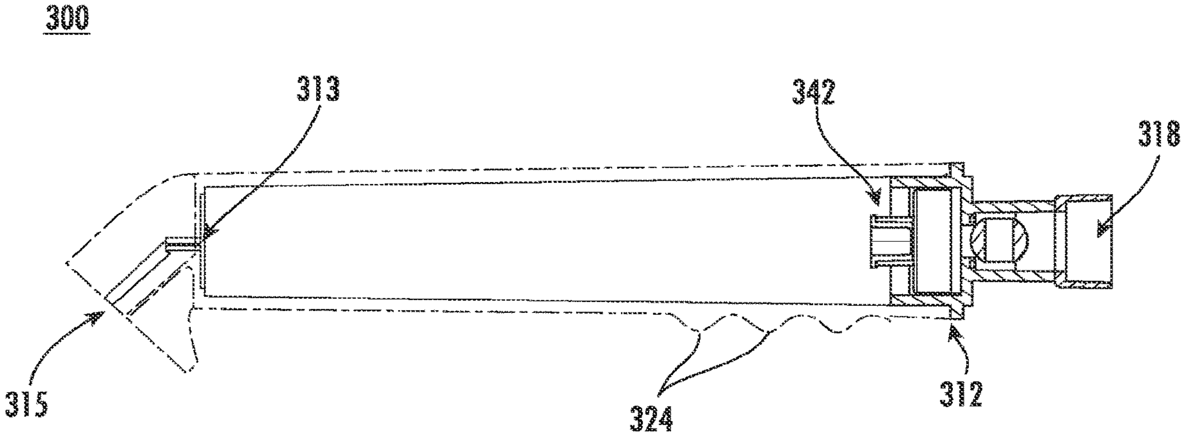
FIG. 23 is a cross-sectional side view of disposable spray wand of FIG. 22.

FIG. 23 is a cross-sectional side view of disposable spray wand of FIG. 22. Spray wand 300 comprises a single spray orifice 315, an integrated screen 313, a non-removable spray body 312 with prefilled solid chemistry, an integrated swirl chamber 342, and an integrated hose nut 318.

Figure 24:
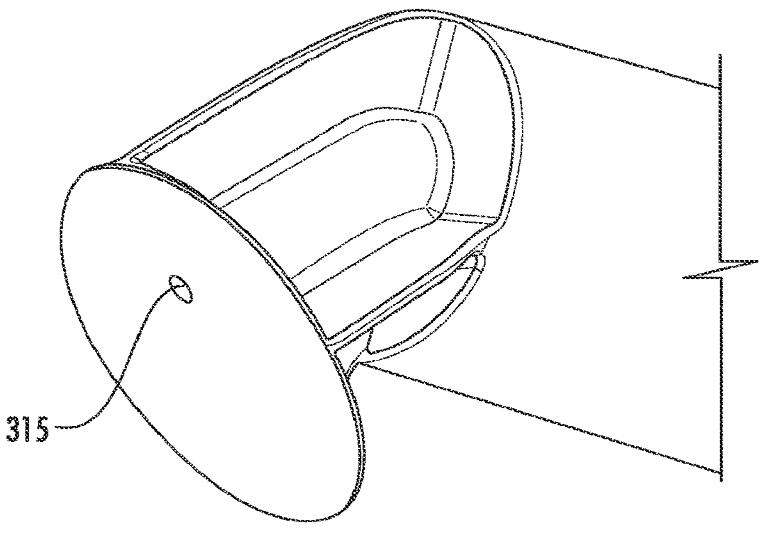
FIG. 24 illustrates the spray orifice.

FIG. 24 illustrates spray orifice 315. FIG. 24 shows a single molded in orifice to deliver the chemistry mixture. Disposable may optionally contain spray nozzle 210.

Figure 25:
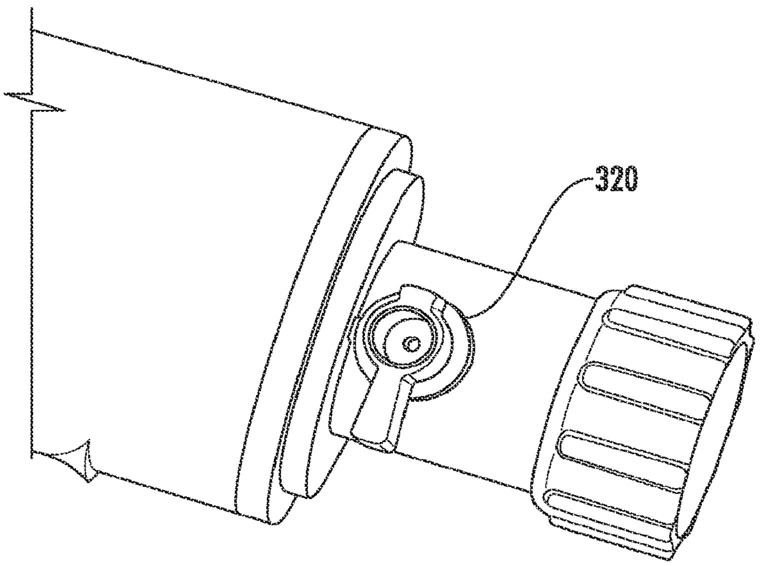
FIG. 25 is a close-up view of the integrated shut-off/hose end.

FIG. 25 is a close-up view of shut-off valve 320 of the integrated shut-off/hose end. FIG. 25 provides a close-up view of the integration of parts.

Figure 26:
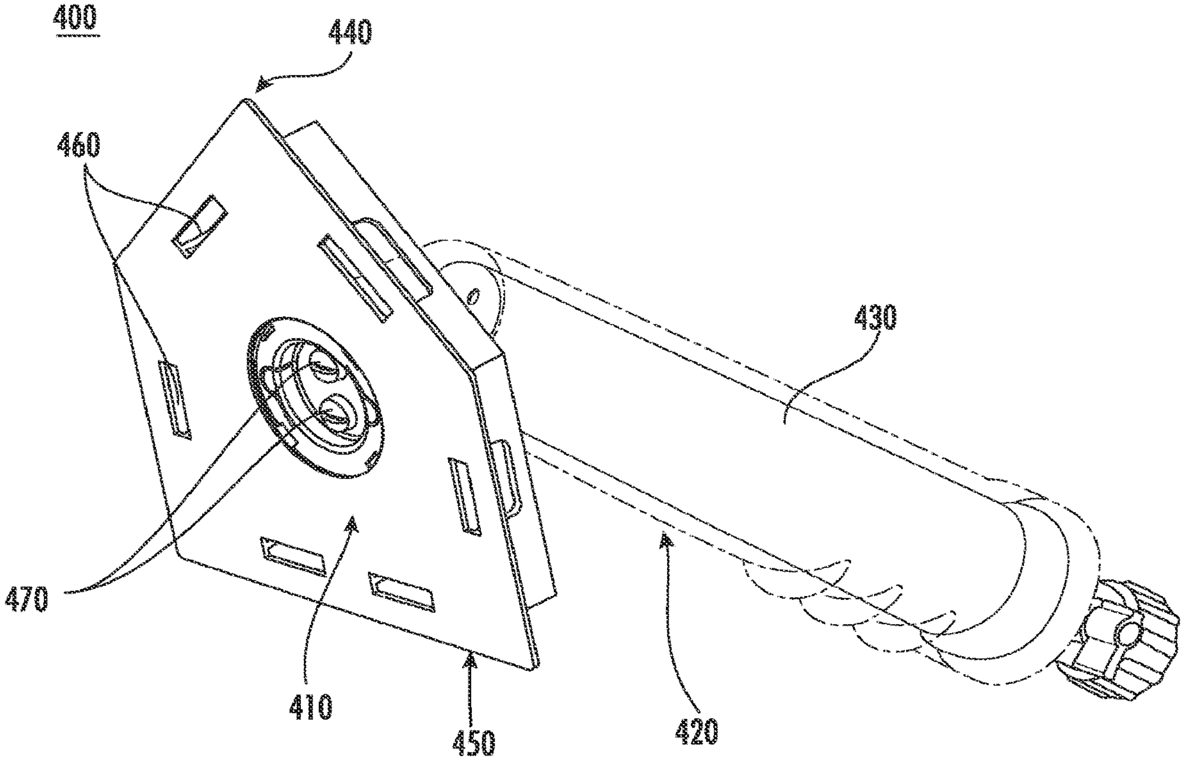
FIG. 26 illustrates the spray wand with car wash nozzle.

In an embodiment of the present invention, a spray wand with car wash nozzle is provided. FIG. 26 illustrates a spray wand 400 having a car wash nozzle 410 for use with a brush or a cloth (such as a microfiber cloth) and a refill cartridge 430 containing solid chemistry suitable for washing a car. Car wash spray nozzle 410 has a large flat foot print preferably with at least two scrub modes: a point 440 on one end to get into tight spots, and a flat surface 450 on the opposite side. The user is to wrap car wash spray nozzle 410 with a micro fiber cloth and tuck the loose ends in through holes 460. The user can cut a hole in the center for the fan spray or allow the fan spray to wet the micro fiber cloth. Car wash spray nozzle 410 preferably has two fan spray nozzles 470 to provide wide coverage of water/solid chemistry spray when in either scrub mode.

Figure 27:
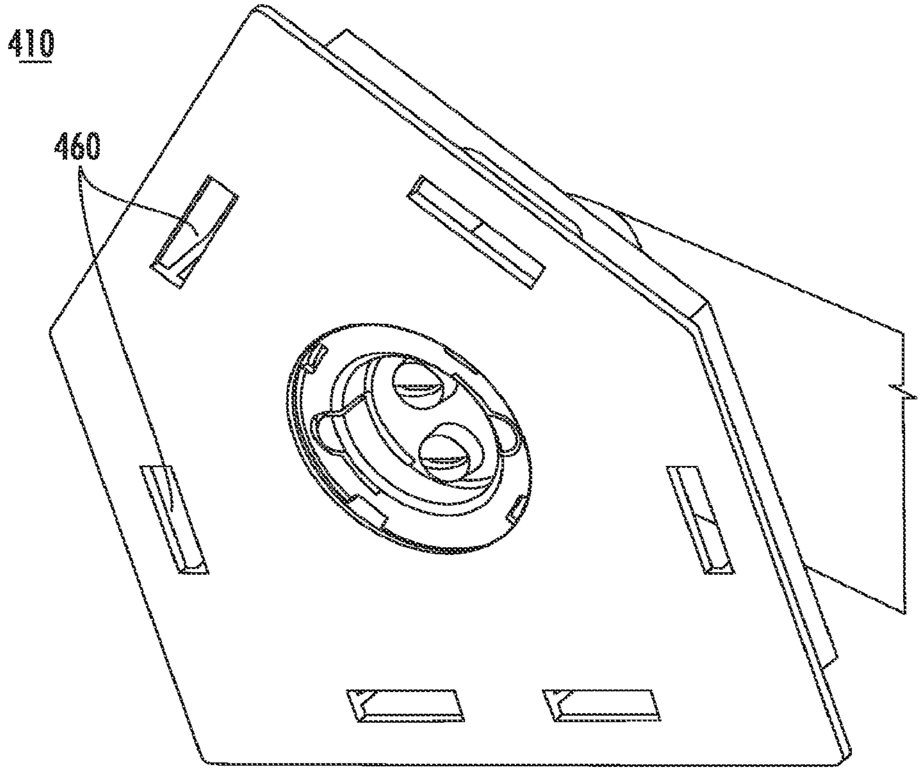
FIG. 27 is a view of the car wash spray nozzle.

FIG. 27 illustrates car wash spray nozzle 410 with two or more spray nozzles 470. Selections can be fan, stream, shower, among others.

Figure 28:
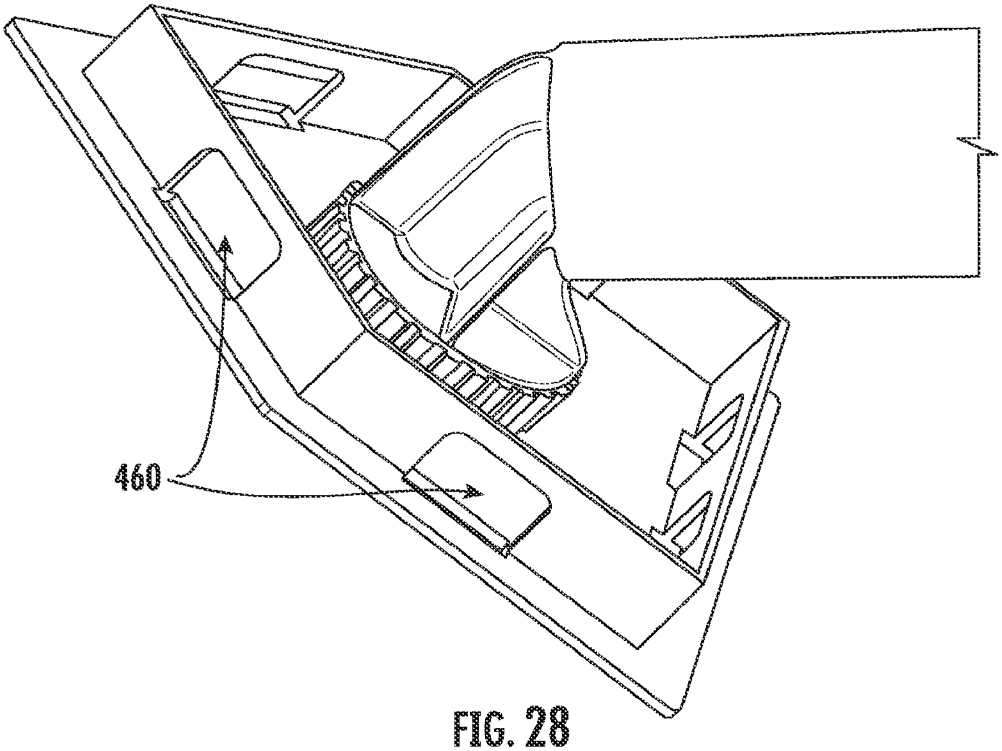
FIG. 28 is a side view of the car wash spray nozzle.

FIG. 28 is a side view of car wash spray nozzle 410. In FIG. 28, the through holes 460 in which to tuck the ends of the micro fiber cloth are shown.

Figure 29:
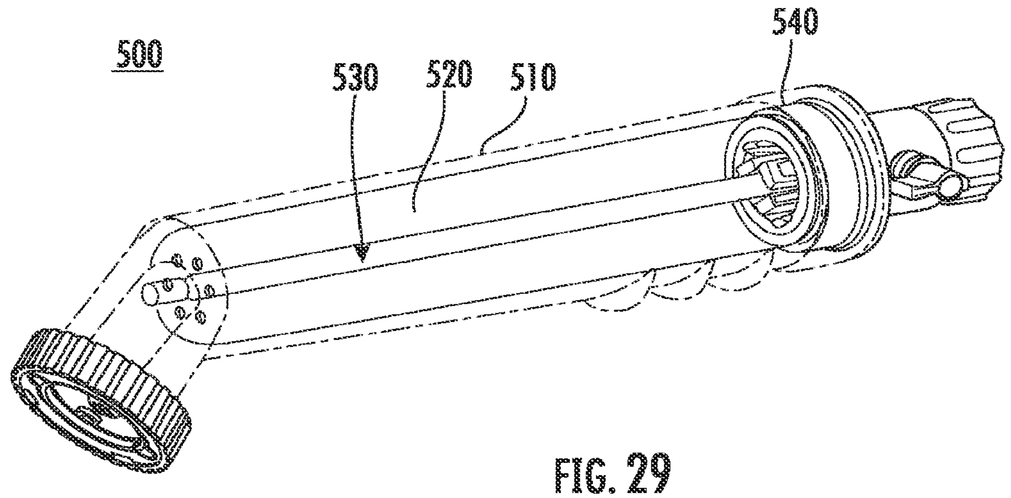
FIG. 29 illustrates a spray wand with rinse selection.

In an embodiment of the invention as shown in FIG. 29, a spray wand 500 with a rinse selection feature is provided. As a feature of spray wand 500, a rinse setting is present inside refill cartridge 520. As shown, spray wand 500 has a central channel or tube 530 that runs along the length of spray wand 500 that by-passes the solid chemistry of refill cartridge 520 for the rinse setting. Refill cartridge 520 holds the solid chemistry and is replaceable. At the shut-off/hose end, the user connects a garden hose with a rotating hose nut. The user can open and close the fluid flow with a shut-off valve to direct water through or around central channel or tube 530.

In a first option, water passes through refill cartridge 520 with swirl chamber in a tangential swirling manner that tumbles through the chemistry, maximizing exposure to the chemistry resulting in higher applied chemistry concentration. The chemistry fluid mix is dispensed at the distal nozzle. The user can rotate the nozzle to select the desired spray setting. In a second option, water passes through refill cartridge 520 down the center of the refill cartridge bypassing the solid chemistry and out the spray nozzle providing a non-chemistry rinse function.

Figure 30:
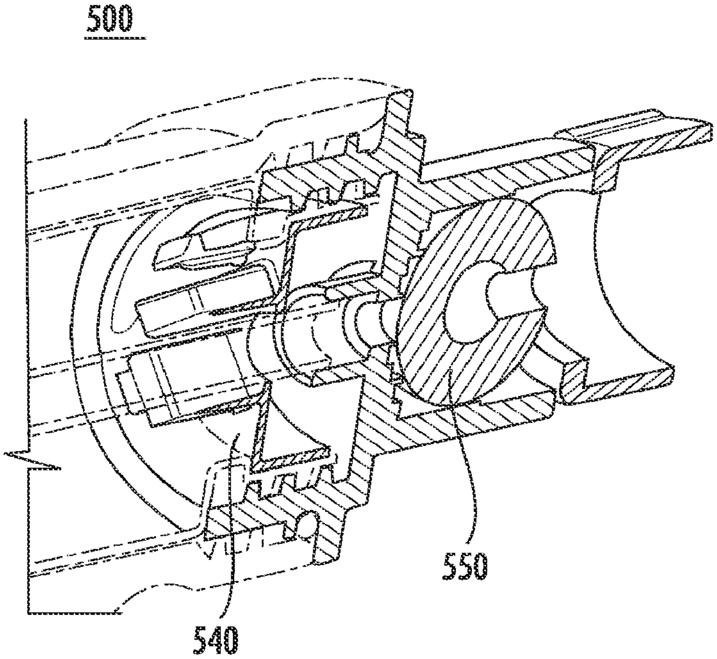
FIG. 30 is a cross-sectional view of spray wand of FIG. 29 with rinse-swirl mode.

FIG. 30 is a cross-sectional view of spray wand 500 of FIG. 29 with rinse-swirl mode. Spray wand 500 works as follows. When shut-off ball valve 550 is in the pictured position in FIG. 30, water enters a hole 545 in the center of shut-off ball valve 550 and is diverted through annular holes or passages that direct water through single swirl chamber 540.

Figure 31:
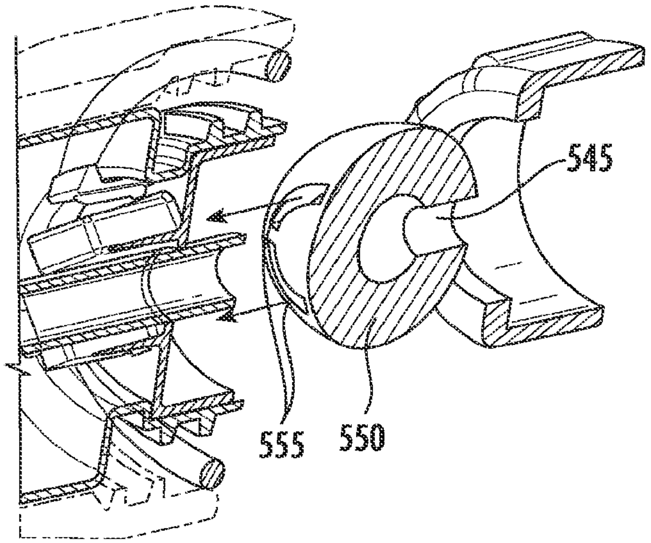
FIG. 31 is a cross-sectional view of spray wand of FIG. 29 with rinse-swirl mode-hose shut-off end suppressed.

FIG. 31 is a cross-sectional view of spray wand of FIG. 29 with rinse-swirl mode-hose shut-off end suppressed. In FIG. 31, the hose shut-off end is suppressed. FIG. 31 illustrates how water enters through single hole 545 and exits shut-off ball valve 550 through annular holes or passages 555 to swirl chamber 550.

Figure 32:
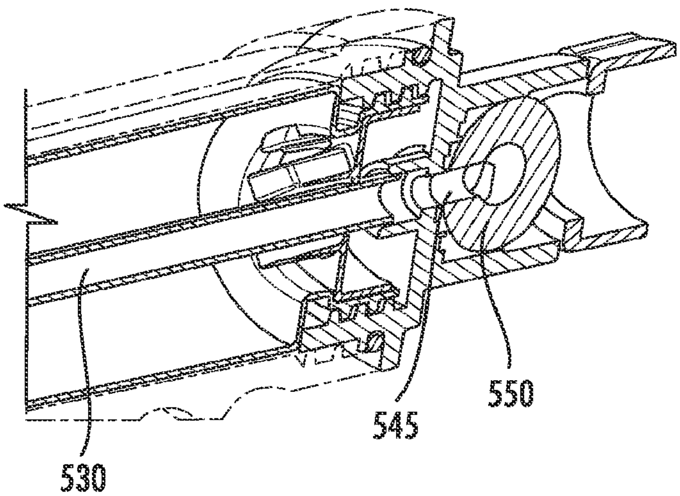
FIG. 32 is a cross-sectional view of spray wand of FIG. 29 with rinse-rinse mode.

FIG. 32 is a cross-sectional view of spray wand 500 of FIG. 29 with rinse-rinse mode. When ball valve 550 is in the pictured position, water enters annular holes or passages 555 in ball valve 550 and is diverted through center hole or passage 545 that directs water to center rinse tube 530.

Figure 33:
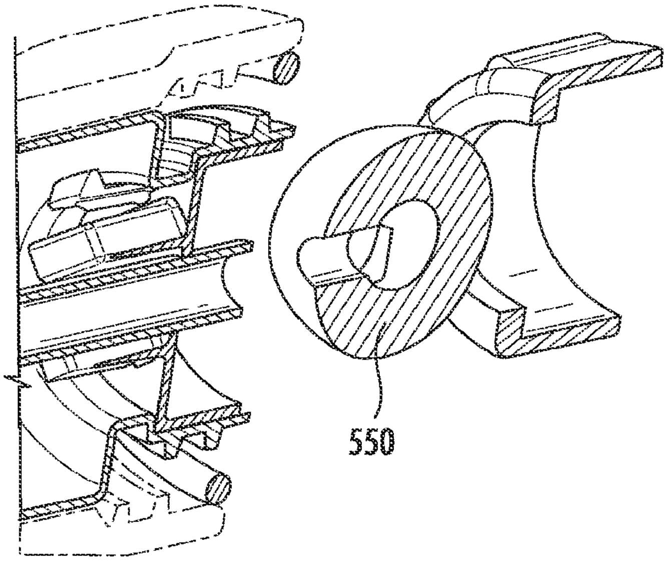
FIG. 33 is a cross-sectional view of spray wand of FIG. 29 with rinse-rinse mode-hose shut-off end suppressed.

FIG. 33 is a cross-sectional view of spray wand with rinse-rinse mode-hose shut-off end suppressed. In this view, the hose shut-off end is suppressed, and how water enters and exits shut-off ball valve 550 is shown.

Figure 34:
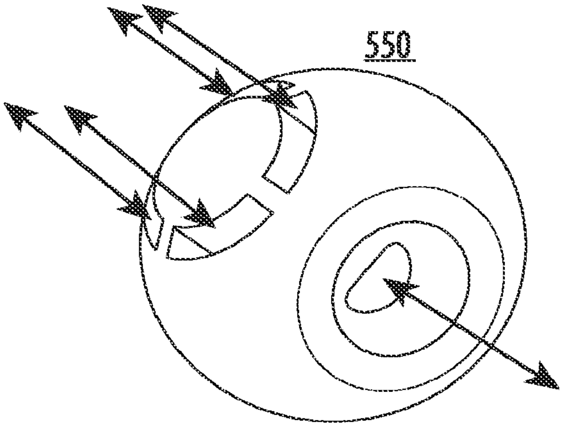
FIG. 34 illustrates the rinse shut-off valve of FIG. 29.

FIG. 34 illustrates rinse shut-off valve 550. As shown in FIG. 34, water flows in and out of passages in the shut-off ball valve. The passages allow for selection of flow by rotating the ball valve 180 degrees which directs fluid flow to the desired solid chemistry or rinse passages. When in an orthogonal 90 degree position, fluid flow is stopped.

Figure 35:
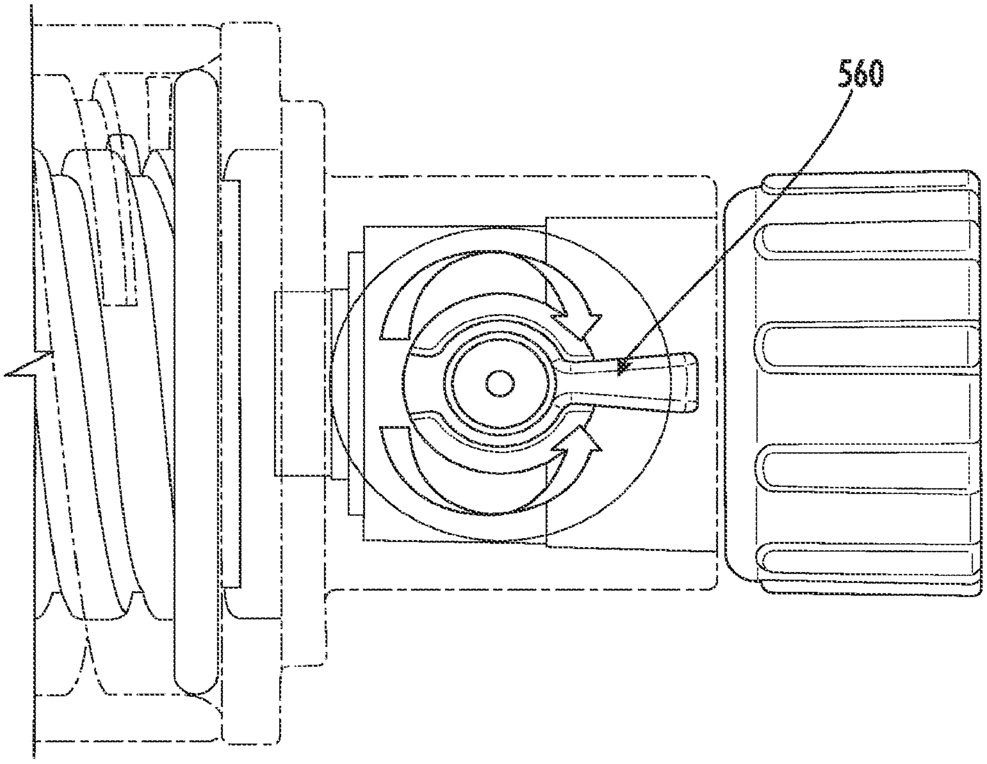
FIG. 35 is an external view of shut-off/hose end.

FIG. 35 is an external view of the shut-off/hose end. FIG. 35 shows how the user can rotate around the valve ball selector 560 to achieve the desired spray function.

Figure 36A:
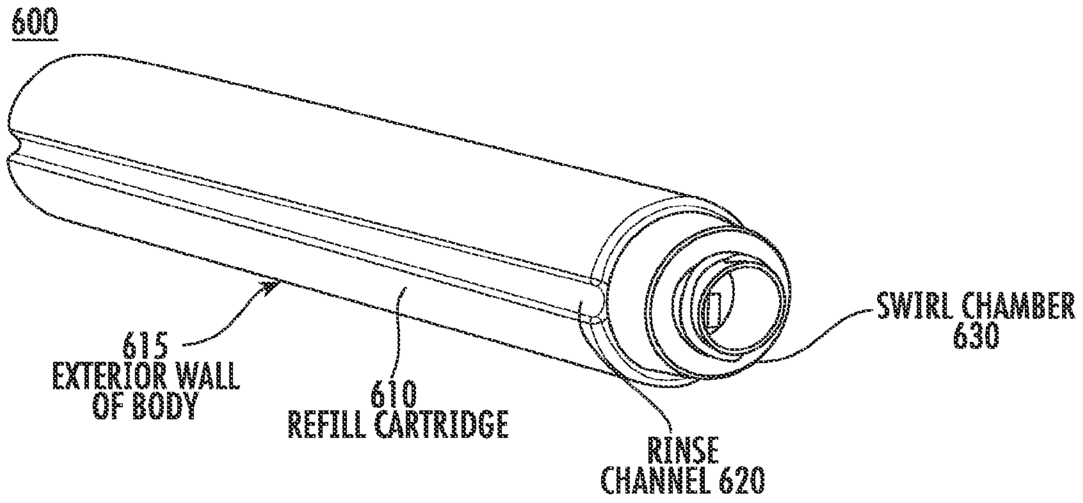
FIGS. 36A, 36B and 36C are isometric views of a refill cartridge assembly with external rinse channels.
Figure 36B:
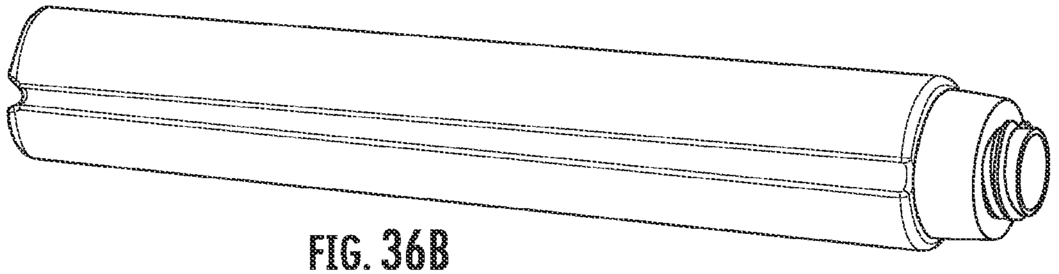
Figure 36C:
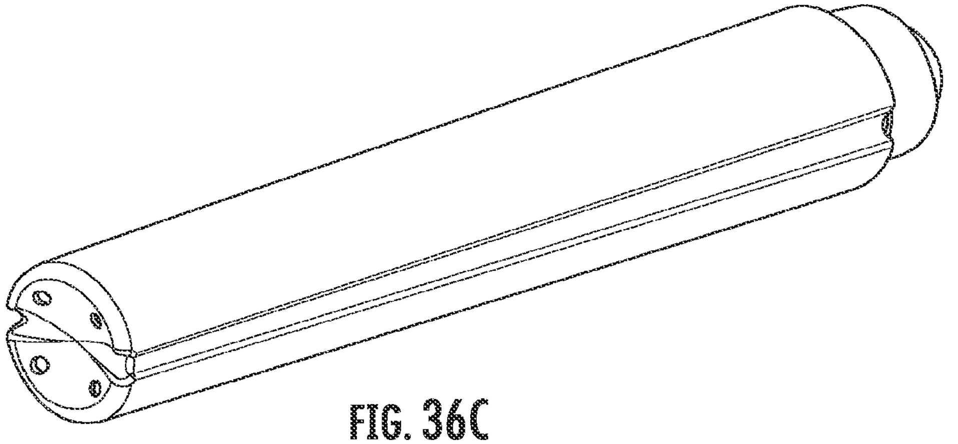

In another embodiment of the present invention, a refill cartridge assembly for use in a spray wand is provided, wherein the refill cartridge provides rinse capability to the spray wand. FIGS. 36A, 36B and 36C are isometric views of refill cartridge assembly 600 with one or more external rinse channels which run along the length of refill cartridge 610. Refill cartridge 610 can be made of a transparent material in order for the contents to be visible. As shown, refill cartridge 610 comprises one or more external rinse channels 620 on an exterior wall of body 615 of refill cartridge 610 to allow water to pass along the refill cartridge in the spray body and exit for rinsing. The external rinse channels 620 can be in the form of indentations or grooves formed into the exterior wall of body 615. The channels run continuously from one end of the refill cartridge to the other end. In a preferred embodiment, the refill cartridge uses two rinse channels, however, more or less rinse channels may be implemented. Spacing between rinse channels may vary. Cross-sectional area should be considered in the number and geometry of the rinse channels as to not restrict flow of water down the rinse channels during the rinse mode as the rinse channels are utilized to direct water flow in rinse mode. Swirl chamber 630 is attached to a proximal end of refill cartridge 610.

Figure 37:
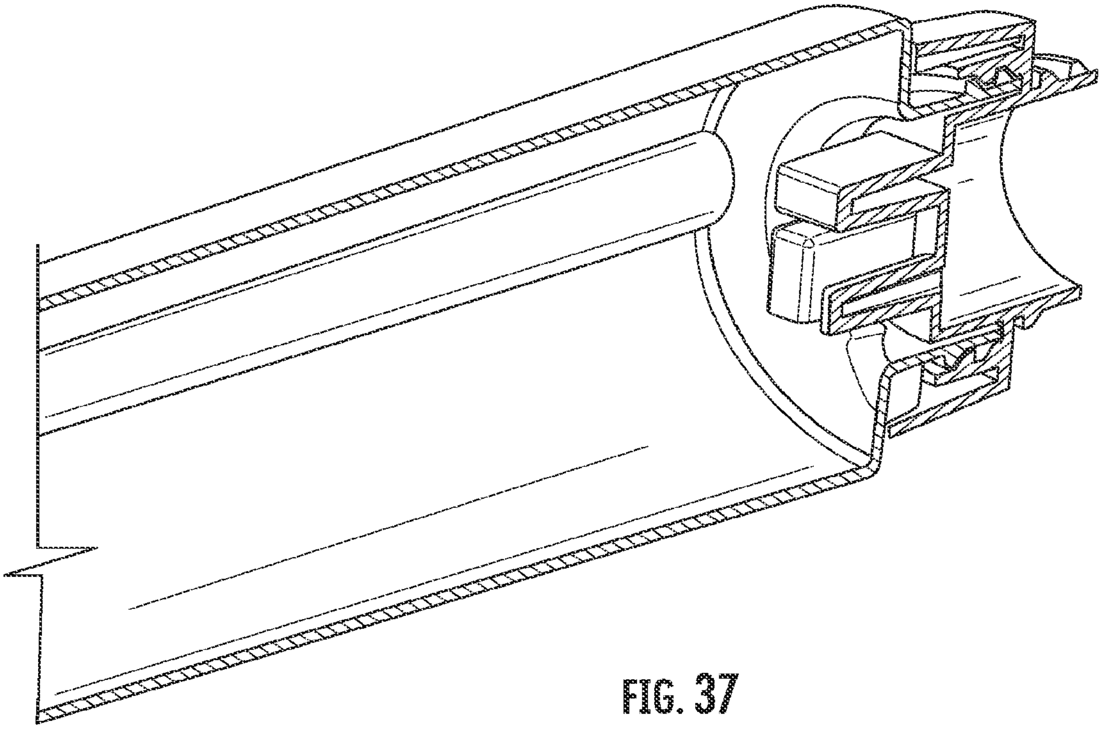
FIG. 37 is an internal view of the refill cartridge assembly of FIGS. 36A, 36B, and 36C.

FIG. 37 is an internal view of the refill cartridge assembly 600 of FIGS. 36A, 36B and 36C.

Figure 38:
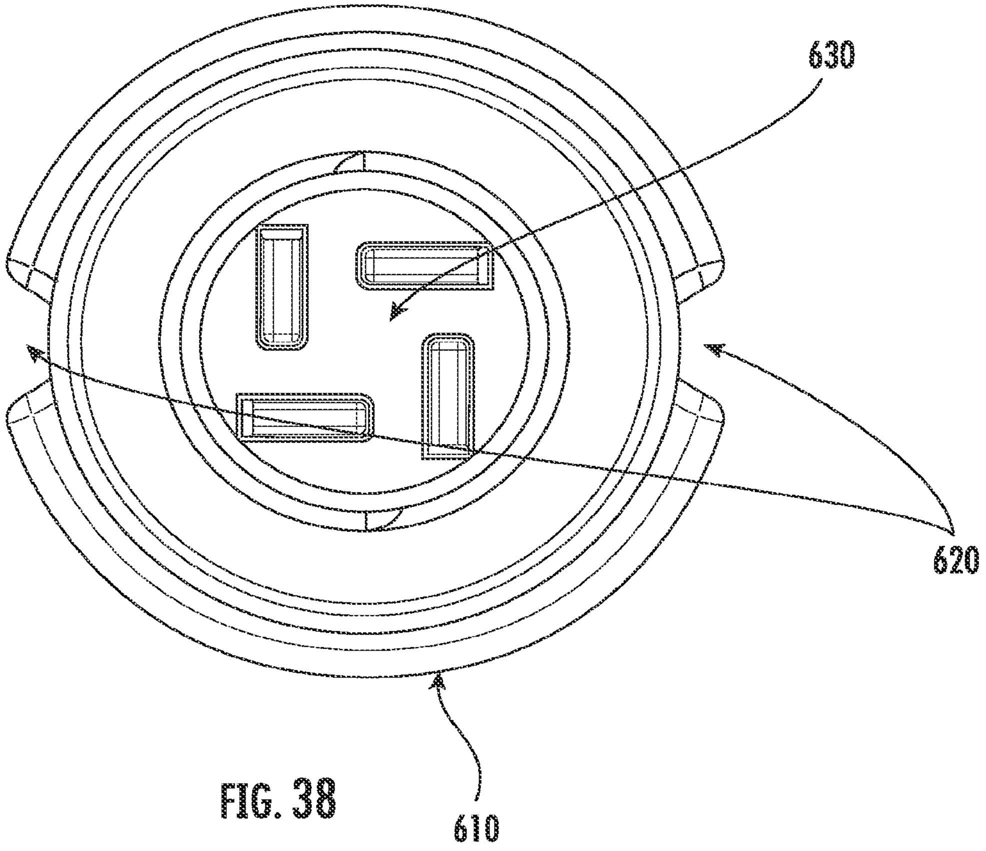
FIG. 38 is an axial view of the refill cartridge assembly of FIGS. 36A, 36B, and 36C.

FIG. 38 is an axial view of refill cartridge assembly 600. This view depicts two rinse channels 620 having an unobstructed flow path. Refill cartridge 610 having swirl chamber 630 affixed thereto enables swirl action for water swirl and mix and ensures the proper dilution of chemistry in the refill cartridge assembly. Swirl chamber 630 is preferably affixed or snapped or screwed with child resistant feature into refill cartridge 610.

Figure 39:
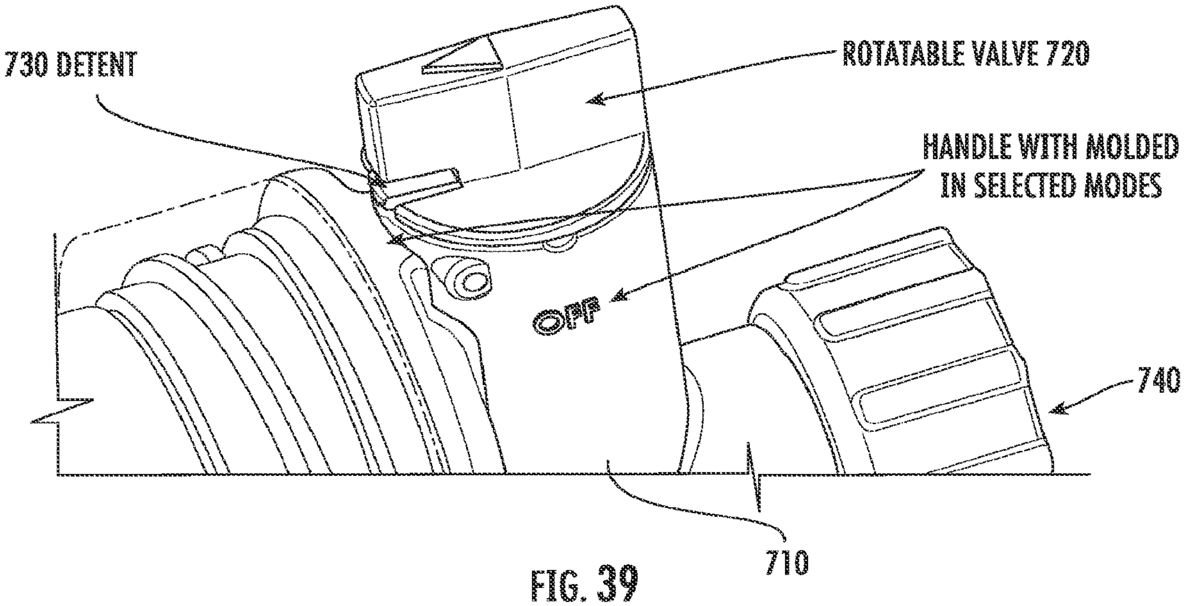
FIG. 39 is an external view of a handle and valve, in wash position, of a spray wand with refill cartridge having external channels in accordance with an embodiment of the present invention.

FIG. 39 is an external view of a handle 710 and a rotatable valve 720, in wash position, of a spray wand 700 with refill cartridge having external channels in accordance with an embodiment of the present invention. In this view, the handle is seen with molded in "wash" and "off" user selected modes 730. Valve 720 can be rotated such that the arrow on top of the rotatable valve lines up with the user selected mode 730. When in the selected mode 730, valve 720 provides positive user feedback by way of feel with a detent 730. In this view, valve 720 is rotated into the "wash" position or mode 730. Internally, water is routed from a hose end inlet 740 to the swirl chamber of the refill cartridge.

Figure 40:
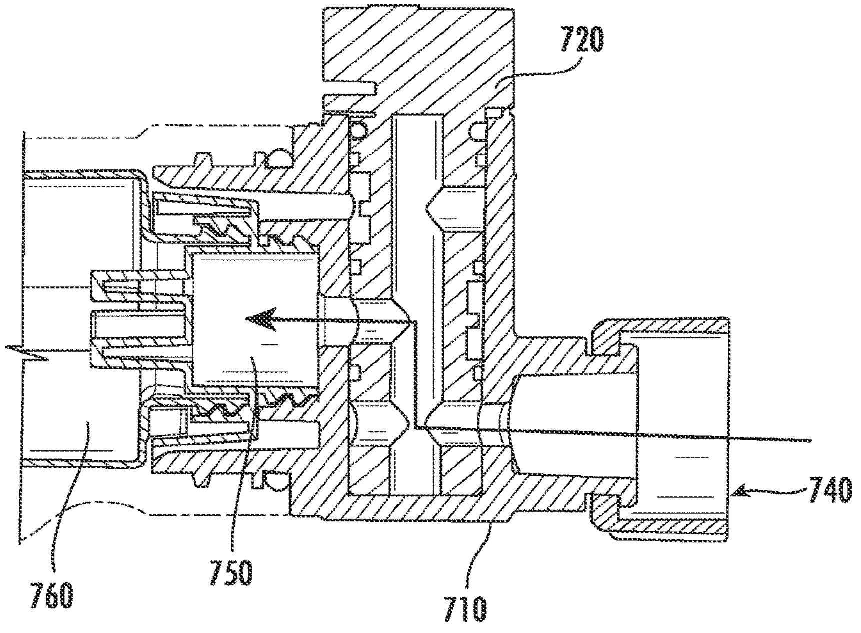
FIG. 40 is a cross-sectional, internal view of a handle and valve, in wash position, of a spray wand with refill cartridge having external channels in accordance with an embodiment of the present invention.

FIG. 40 is an internal view of handle 710 and rotatable valve 720, in wash position, of a spray wand 700 with refill cartridge having external channels in accordance with an embodiment of the present invention. In this view, when the valve is rotated into the "wash" position or mode 730, water is routed as shown by arrow from hose end inlet to a swirl chamber 750 of a refill cartridge 760. In this mode, water passes through the center of the refill cartridge containing solid chemistry. The refill cartridge screws directly into handle and is threaded. When valve 720 is set to the "wash" mode, the water stream is not restricted and allows for maximum spray output for "reach" of cleaning solution. The refill cartridge leaves sufficient room to allow water to bypass around the refill cartridge when in the rinse mode.

Figure 41:
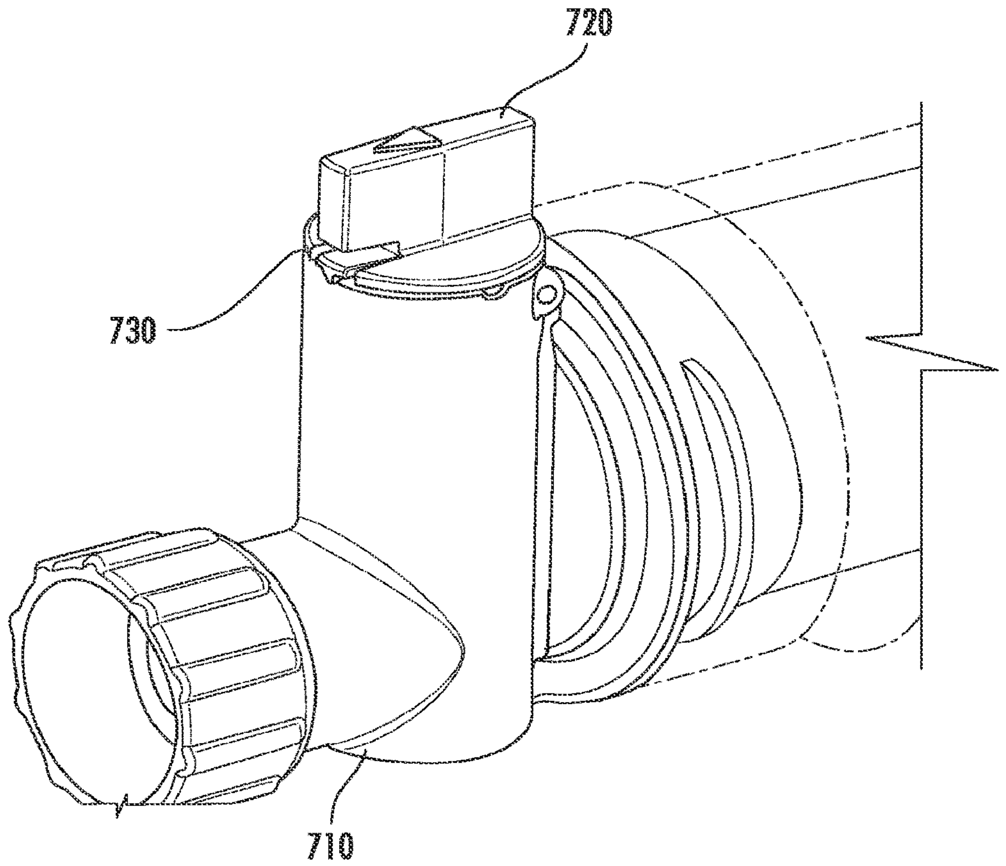
FIG. 41 is an external view of a handle and valve, in rinse position, of a spray wand with refill cartridge having external channels in accordance with an embodiment of the present invention.

FIG. 41 is an external view of handle 710 and rotatable valve 720, in rinse position of a spray wand 700 with refill cartridge having external channels in accordance with an embodiment of the present invention. In this view, the handle can be seen with molded in "rinse" and "off" modes. Valve 720 can be rotated such that the arrow on top of the rotatable valve lines up with the user selected mode 730. When in the selected mode, valve 720 provides positive user feedback by way of feel with detent 730. In this view, valve 720 is rotated into the "rinse" position or mode 730. Internally, water is routed from the hose end inlet bypasses the swirl chamber of the refill cartridge, and flow is directed around the external rinse channels of the refill cartridge.

Figure 42:
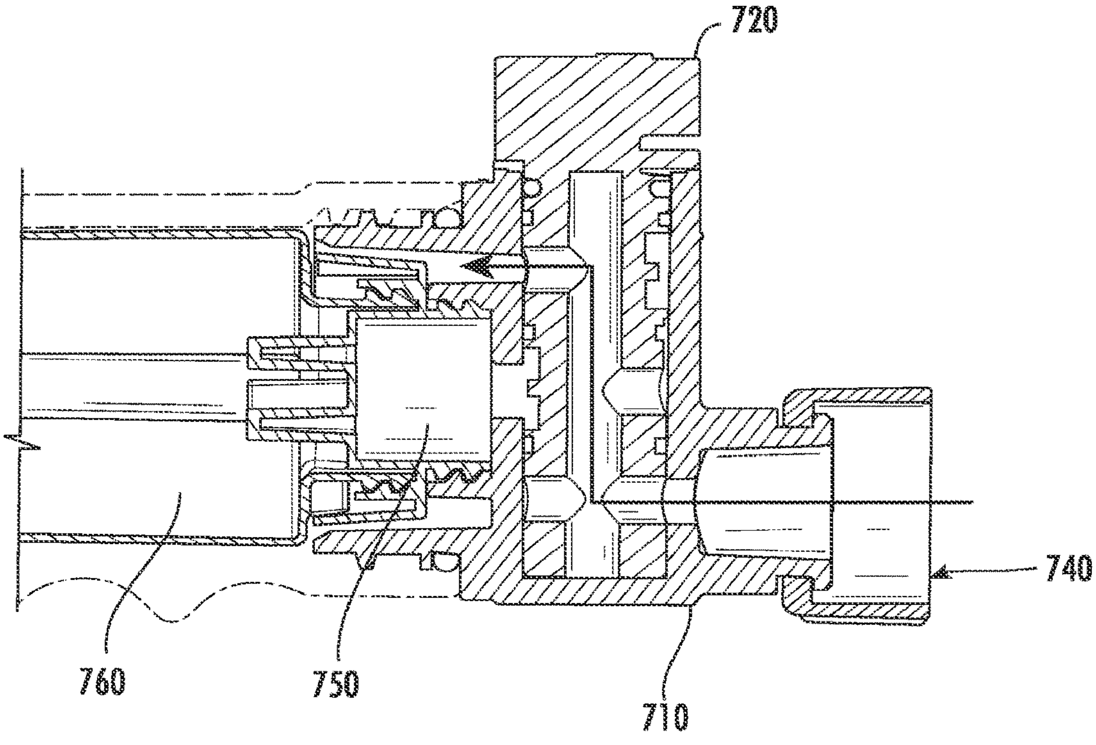
FIG. 42 is a cross-sectional, internal view of handle and valve, in rinse position, of a spray wand with refill cartridge having external channels in accordance with an embodiment of the present invention.

FIG. 42 is an internal view of handle 710 and rotatable valve 720, in rinse position, of a spray wand 700 with refill cartridge having external channels in accordance with an embodiment of the present invention. In this view, valve 720 is rotated into the "rinse" position or mode. Internally, water routed as shown by arrow from hose end inlet 740 bypasses internal swirl chamber 750 of refill cartridge 760, and flow is directed around the external rinse channels of the refill cartridge.

Figure 43:
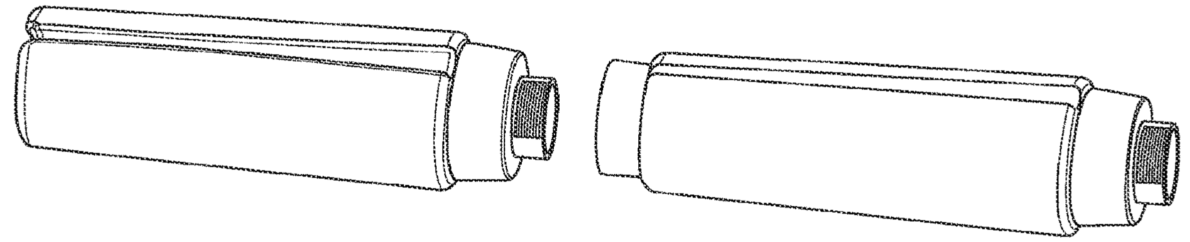
FIG. 43 is a perspective view of a multiple and stackable refill cartridge option, with refill cartridges unattached.
Figure 44:
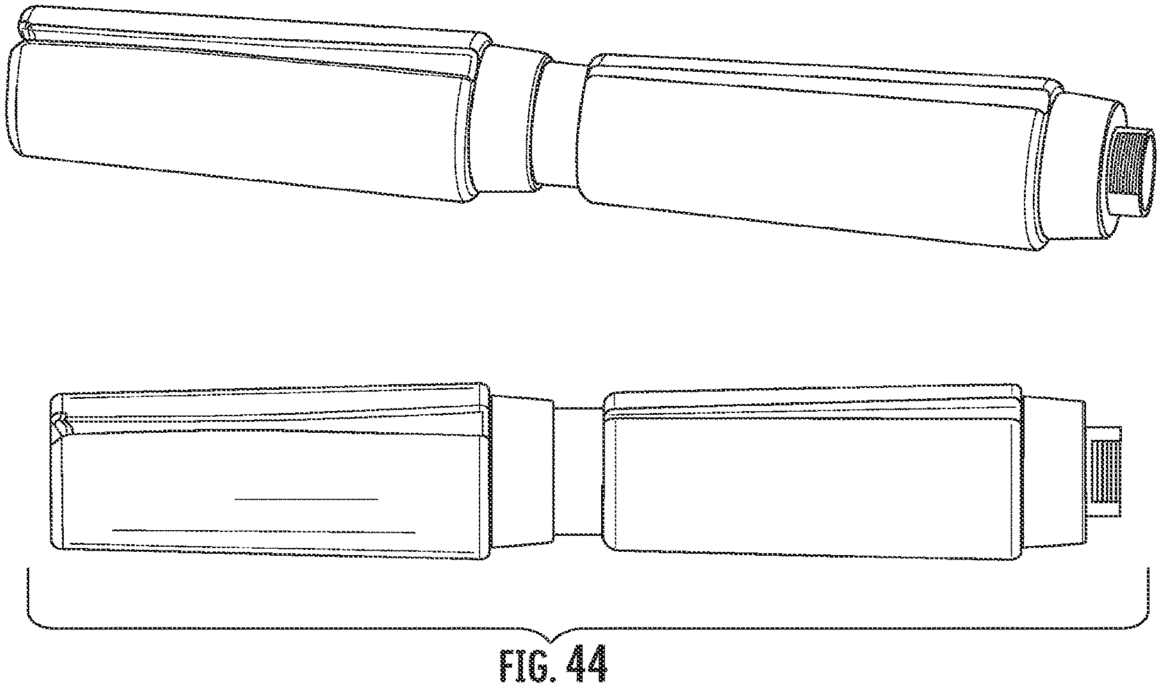
FIG. 44 is a perspective view of a multiple and stackable refill cartridge option, with refill cartridges attached.

The spray wand of the present invention may be of varying dimension including, but not limited to, length. Likewise, the refill cartridge may be of varying dimension including, but not limited to, length. For example, the refill cartridge may be ¼, ⅓, ½, etc., of the length of the spray wand body and one or more refill cartridges connect such as by threaded connections in order to run the entire length of the spray wand body. Different solid chemistry may be contained in each connected refill cartridge. FIG. 43 is a perspective view of a multiple and stackable refill cartridge option, with refill cartridges unattached. FIG. 44 is a perspective view of a multiple and stackable refill cartridge option, with refill cartridges attached. Each refill cartridge may contain its own solid chemistry which may be the same or different from the other refill cartridges.

In an embodiment of the present invention, the spray wand further comprises an insert/refill adapter. The refill adapter is threaded and is to be inserted into the hose wand handle (shutoff end).

Figure 45:
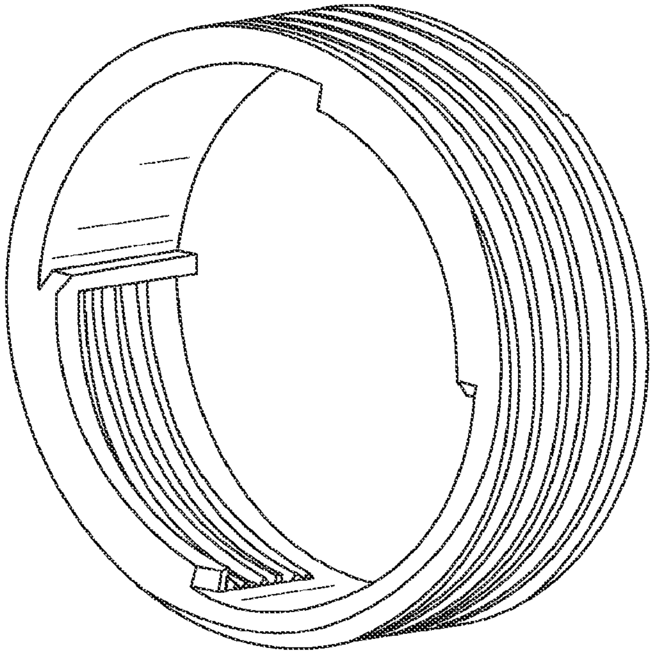
FIG. 45 illustrates an insert/refill cartridge adapter.

FIG. 45 illustrates an optional insert/refill cartridge adapter. Preferably, the insert/refill cartridge adapter is ring-shaped and having internal and external threads. FIG. 45 illustrates the insert/refill cartridge adapter with standard threads but custom threads are possible. The insert/refill adapter provides the ability to use different lock and key configurations for the refill cartridge.

Figure 46:
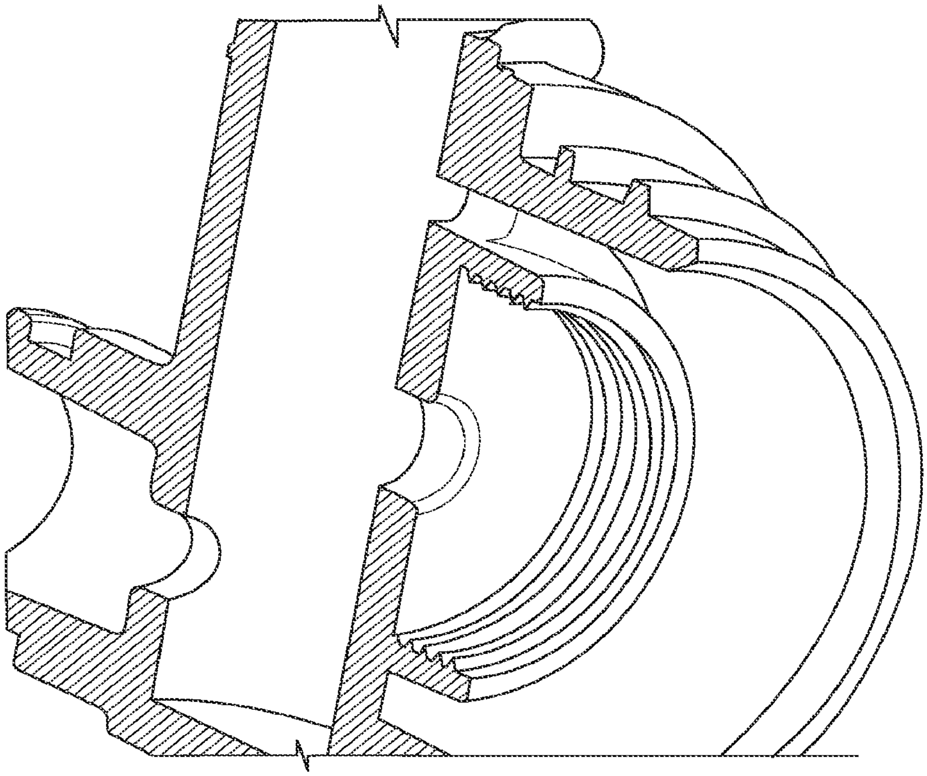
FIG. 46 illustrates the hose wand handle where the insert/refill cartridge adapter is received by the hose wand handle.

FIG. 46 illustrates the hose wand handle where the insert/refill cartridge adapter is received by the hose wand handle. The insert/refill cartridge adapter is inserted into the handle of the wand hose end and the insert/refill cartridge adapter is configured for receiving a mating threaded end of a refill cartridge.

Figure 47:
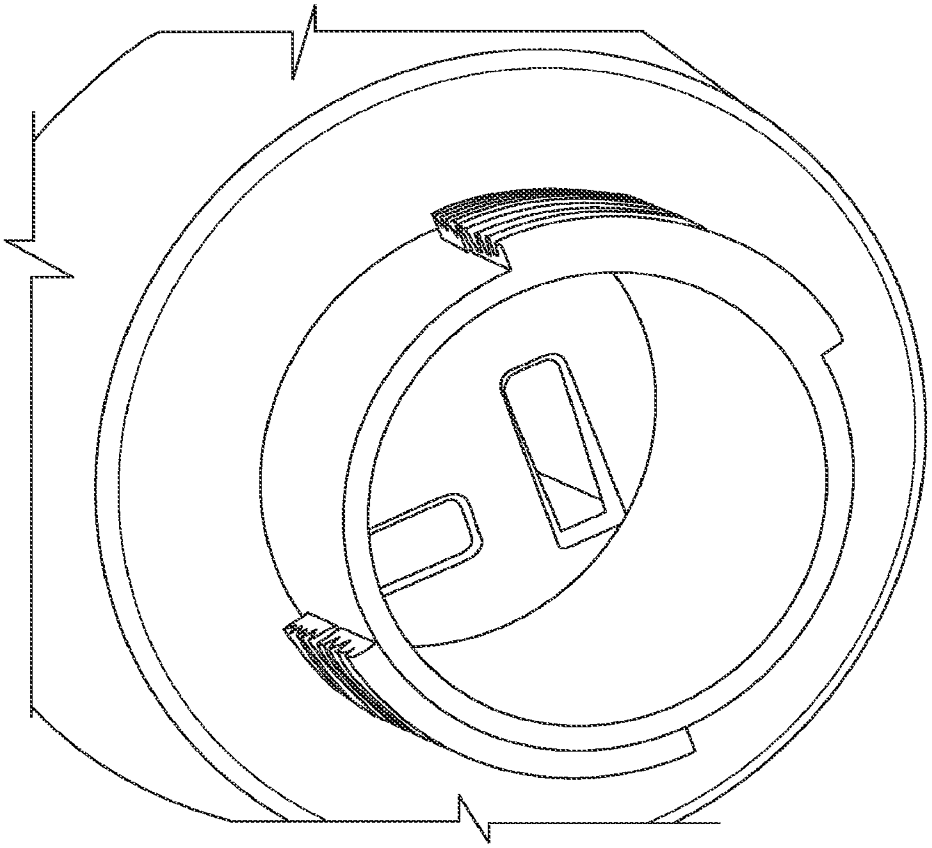
FIG. 47 illustrates a refill cartridge that can be inserted into an insert/refill cartridge adapter.

FIG. 47 illustrates the refill cartridge that can be inserted into an insert/refill cartridge adapter. In this example, the cartridge shown has custom threads and mating custom threads would be required on the respective insert/refill cartridge adapter.

Figure 48:
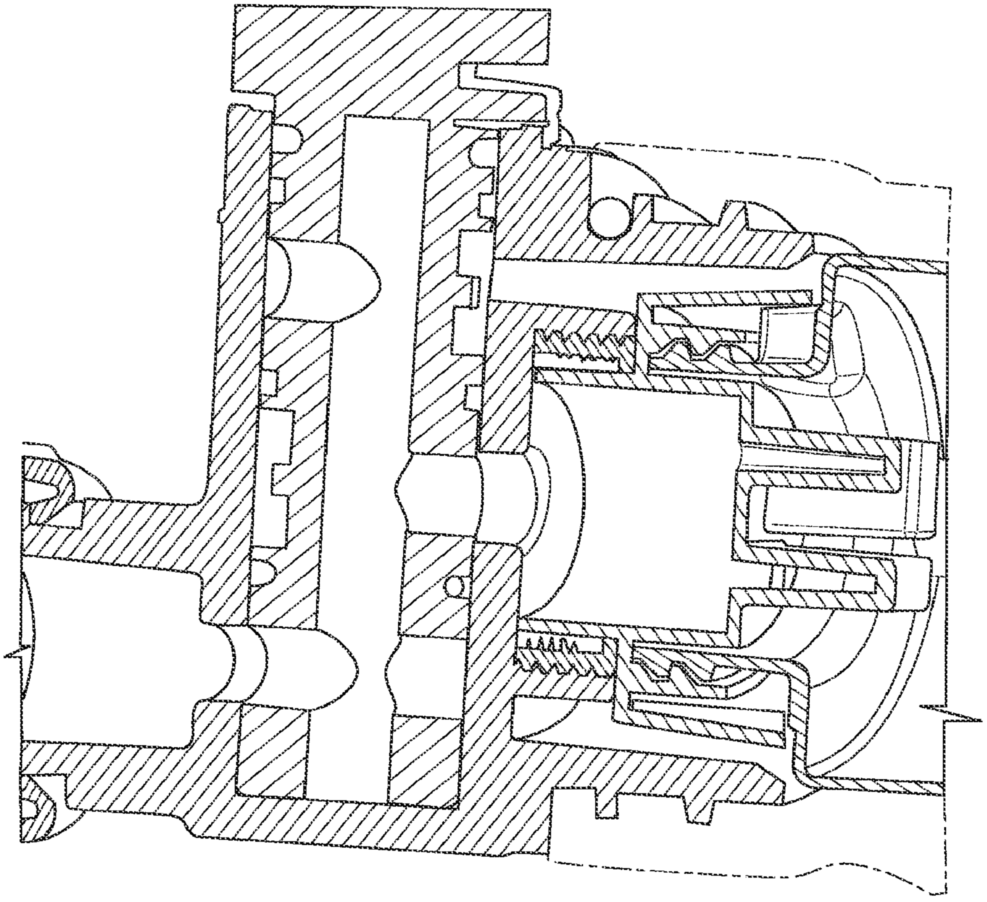
FIG. 48 illustrates a hose wand sprayer assembly showing the insert/refill cartridge adapter installed and interrelation of the components.

FIG. 48 illustrates the hose wand sprayer assembly showing the insert/refill cartridge adapter installed and interrelation of the components.

There are numerous benefits associated with the spray wand of the present invention. The benefits of the spray wand include, but are not limited to, ergonomic, ease of refill, longer lasting chemistry, farther spray distance and with longer reach, easy visibility for refill/transparent, versatility in range of motion, and metering benefits, improved safety, solid chemistry lighter weight for shipping and usage, among others.

The spray wand of the invention is ergonomic, for example, by providing balance to the user as the hose is connected into the handle such that a consumer can use the spray wand with one hand while cleaning as opposed to requiring use of two hands. The use of solid chemistry in the spray wand of the present invention makes the spray wand lighter in weight as compared to other products requiring water as part of their formulation chemistry.

Figure 49:
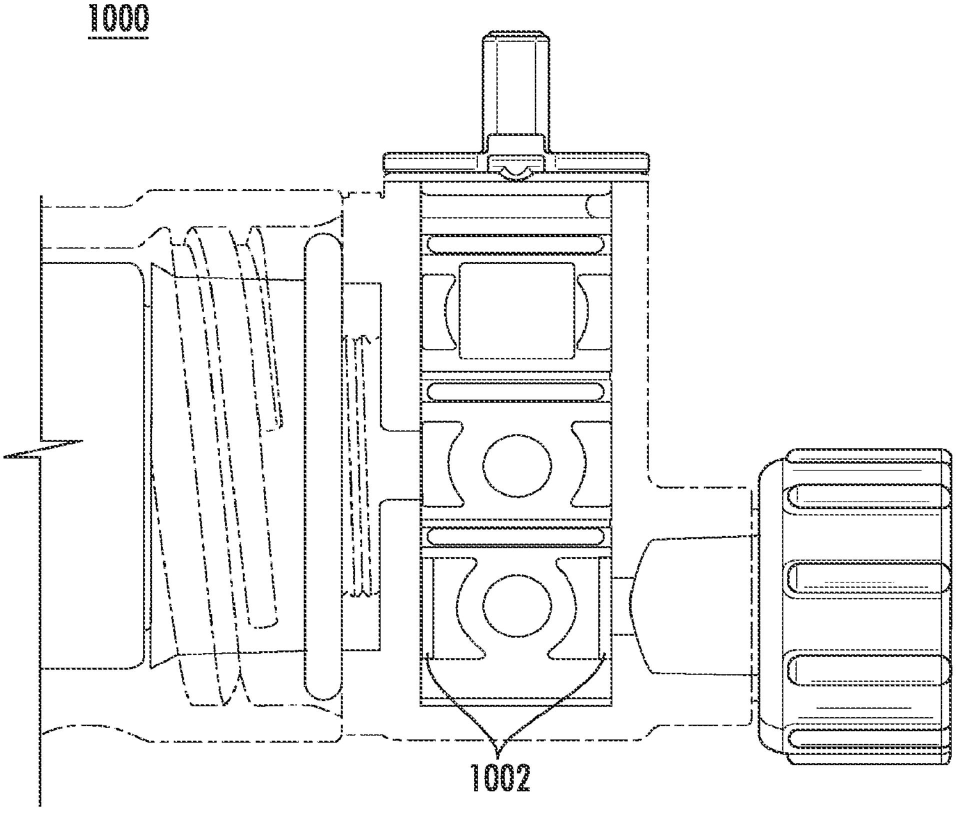
FIG. 49 illustrates stopper pads added to the spray wand shutoff/hose end valve.

FIG. 49 illustrates a spray wand shutoff/hose end valve 1000 having stopper pads 1002. A purpose of including the stopper pads is to provide added protection for fluid shut off when the valve is in the user selected "off" position. The additional stopper pads reduce the potential of fluid leakage.

Figure 50:
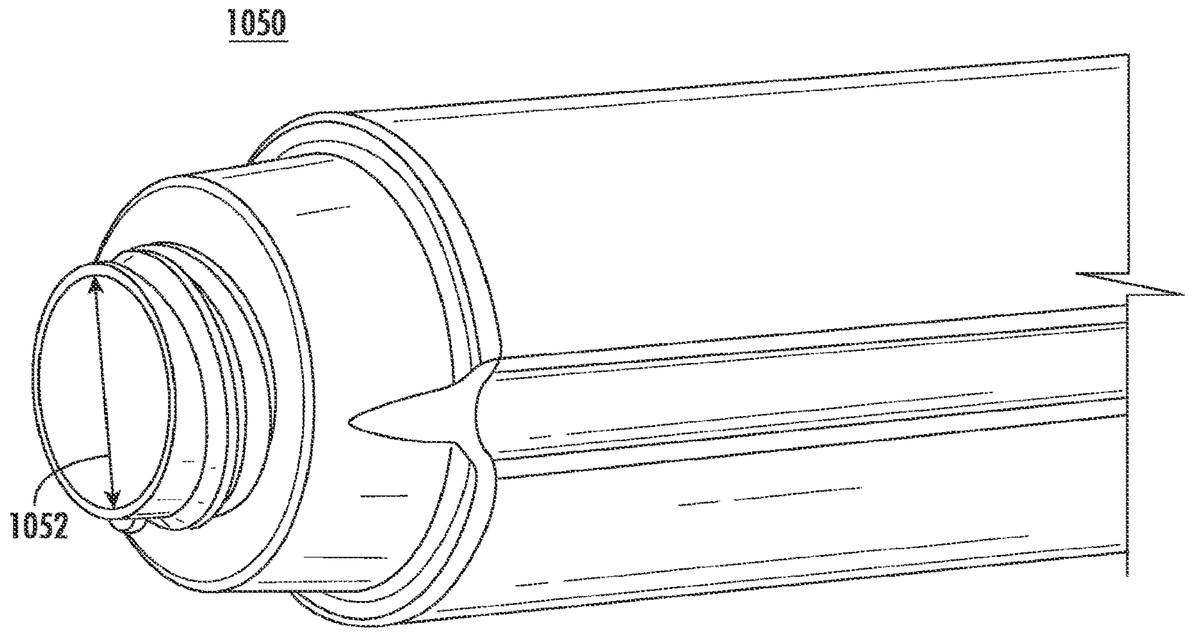
FIG. 50 illustrates a refill cartridge attached to a swirl chamber having an opening for water entry.

FIG. 50 illustrates a refill cartridge 1050 attached to a swirl chamber having an opening 1052 for water entry.

Figure 51:
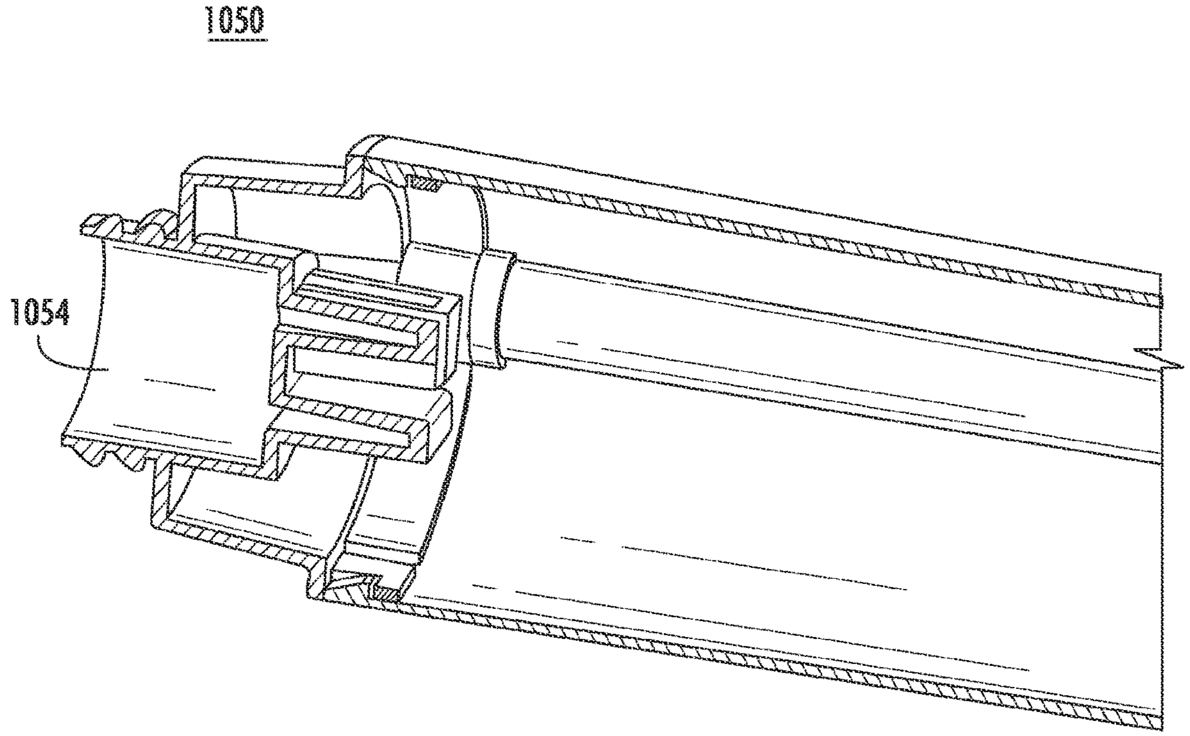
FIG. 51 illustrates a cross-section of the refill cartridge of FIG. 50 with a snap on swirl chamber.

FIG. 51 illustrates a cross-section of refill cartridge 1050 of FIG. 50 with a snap on swirl chamber 1054.

Figure 52:
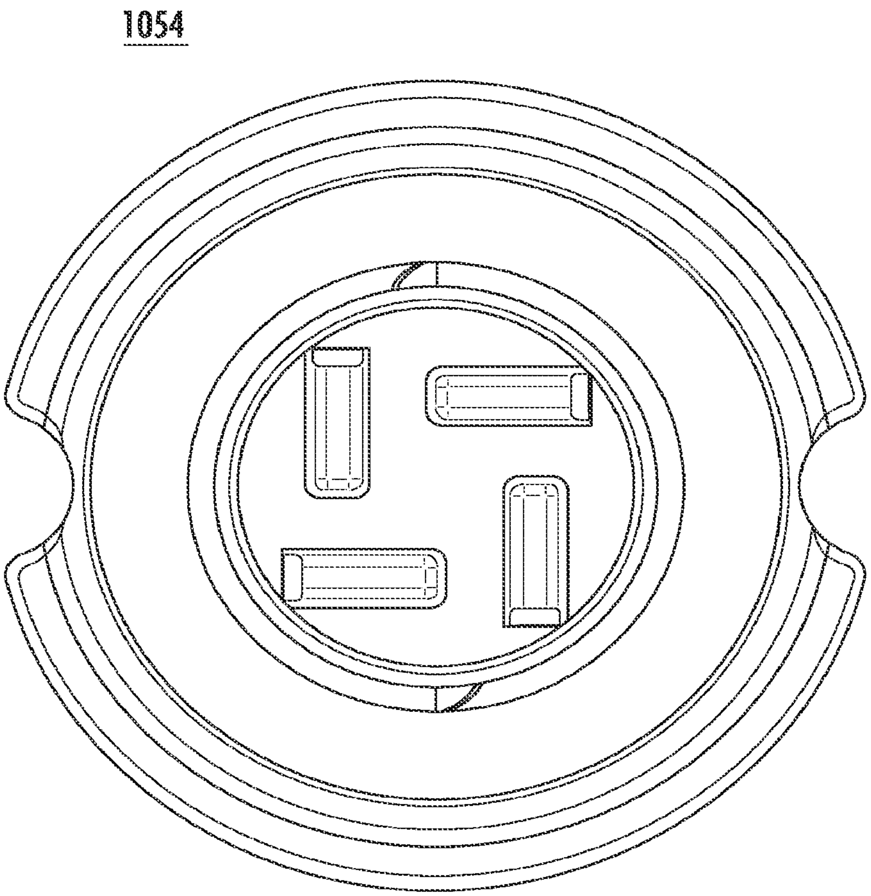
FIG. 52 illustrates a top view of the swirl chamber.

FIG. 52 illustrates a top view of swirl chamber 1054. The swirl chamber has the capability to snap into the refill cartridge.

Figure 53:
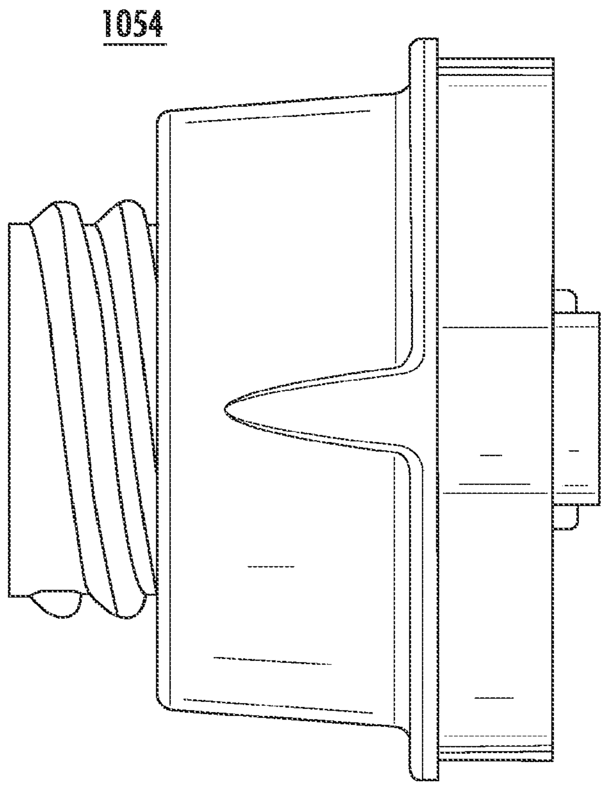
FIG. 53 illustrates a side view of the swirl chamber.

FIG. 53 illustrates a side view of swirl chamber 1054.

Figure 54:
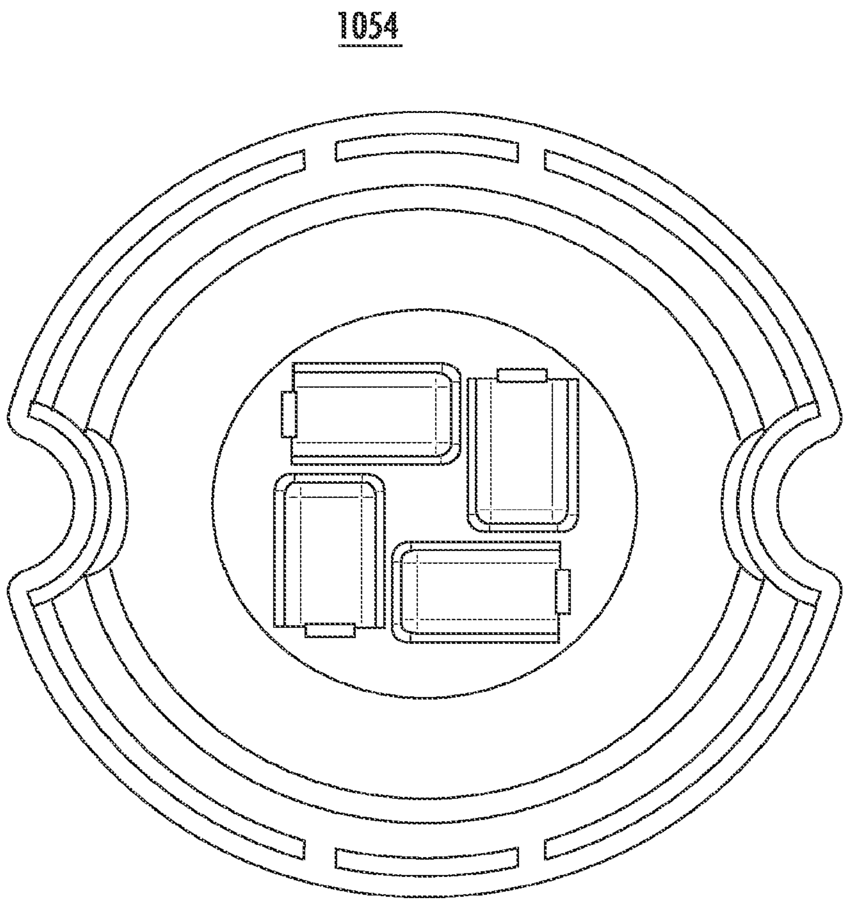
FIG. 54 illustrates an internal view of the swirl chamber.

FIG. 54 illustrates an internal view of swirl chamber 1054.

Figure 55:
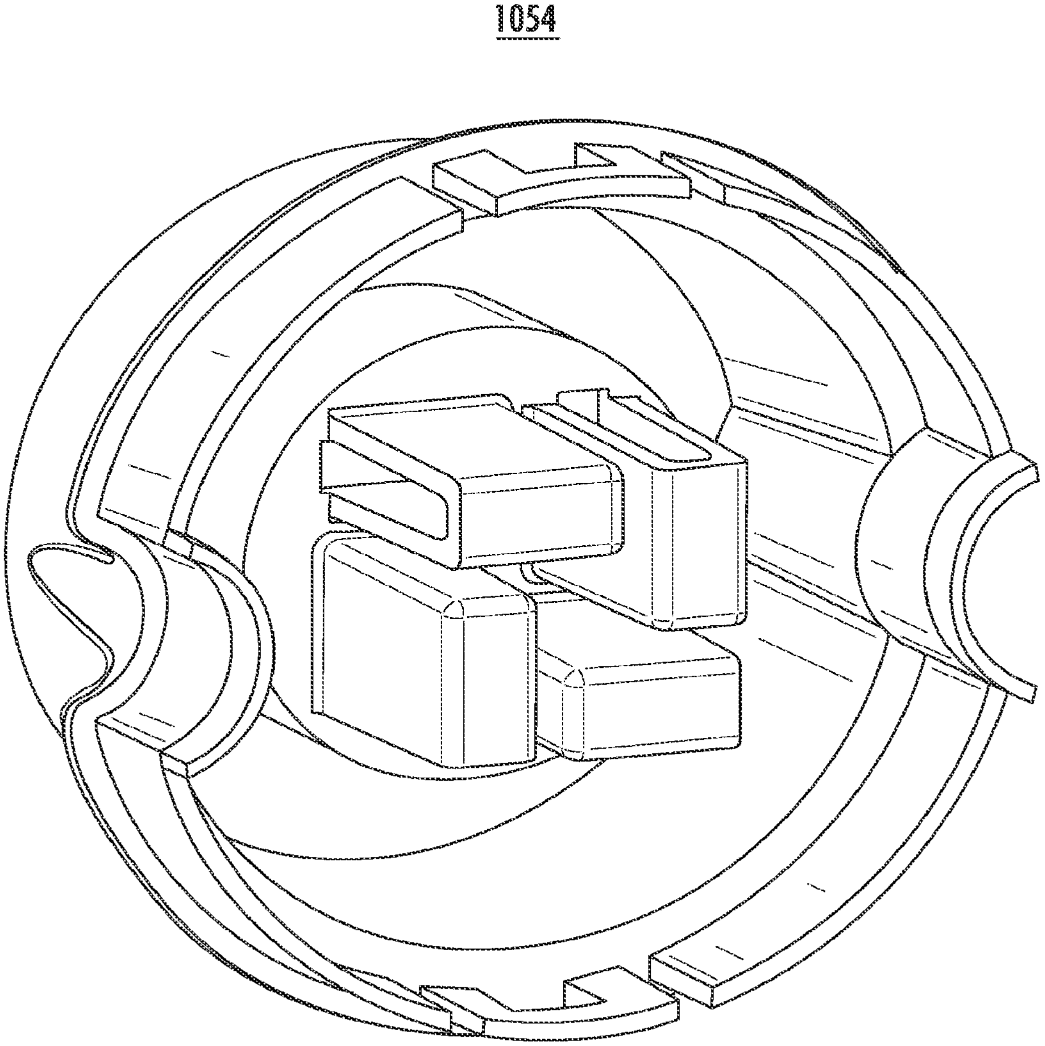
FIG. 55 is a perspective internal view of the swirl chamber.

FIG. 55 is a perspective internal view of swirl chamber 1054.

Figure 56:
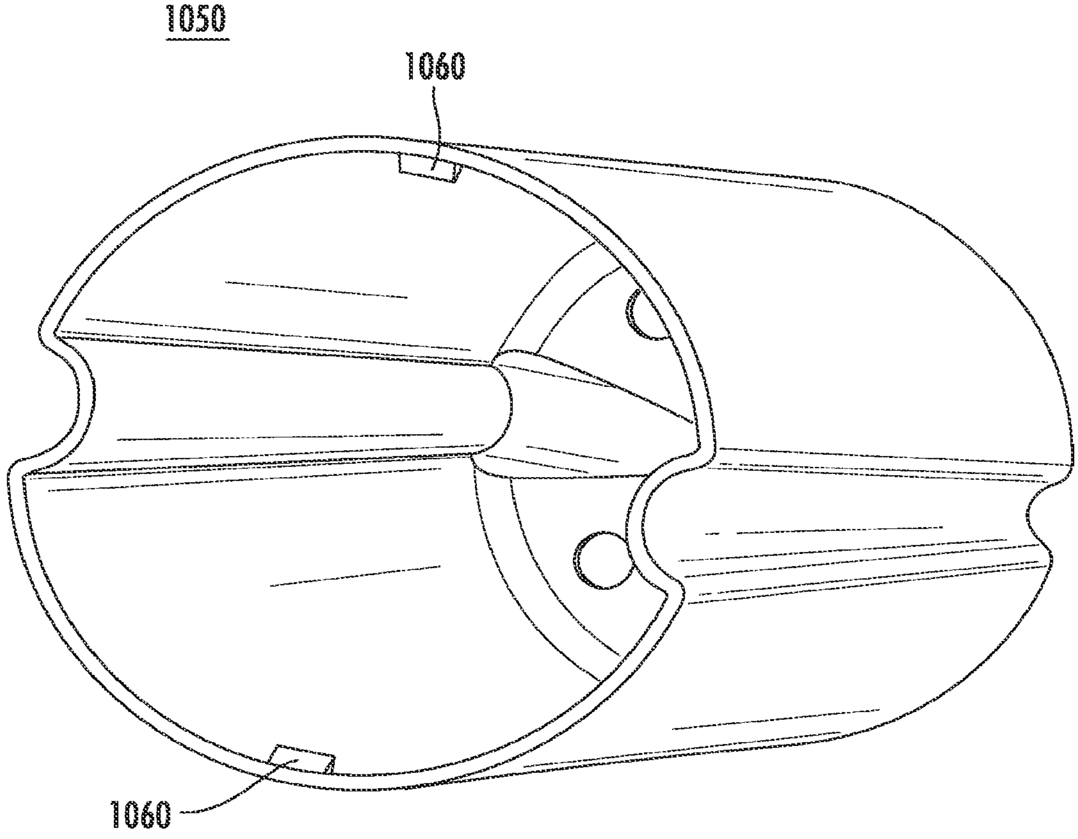
FIG. 56 is an internal view of the refill cartridge having an enlarged opening and nubs.

FIG. 56 is an internal view of refill cartridge 1050 having an enlarged opening and nubs 1060. The nubs on the top of the refill cartridge are for locking into mating parts on the swirl chamber.

Figure 57:
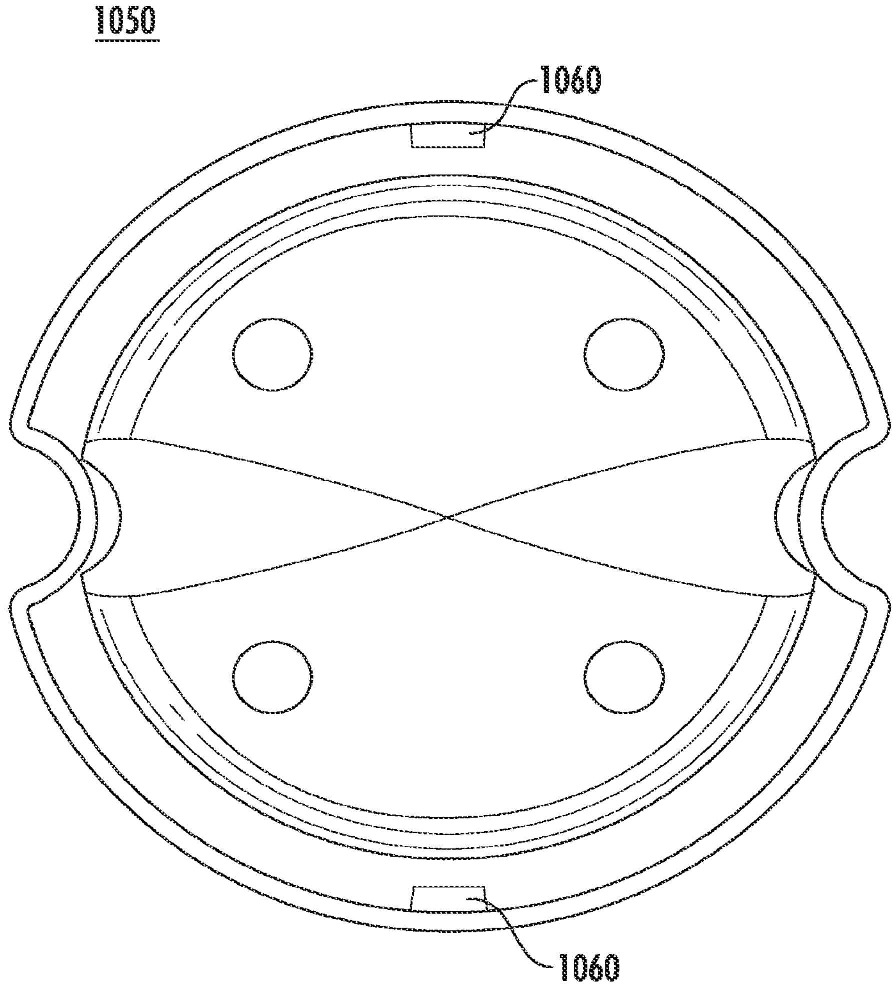
FIG. 57 illustrates a top view of the refill cartridge looking down through the large opening of the refill cartridge.

FIG. 57 illustrates a top view of refill cartridge 1050 looking down through the large opening of the refill cartridge.

Figure 58:
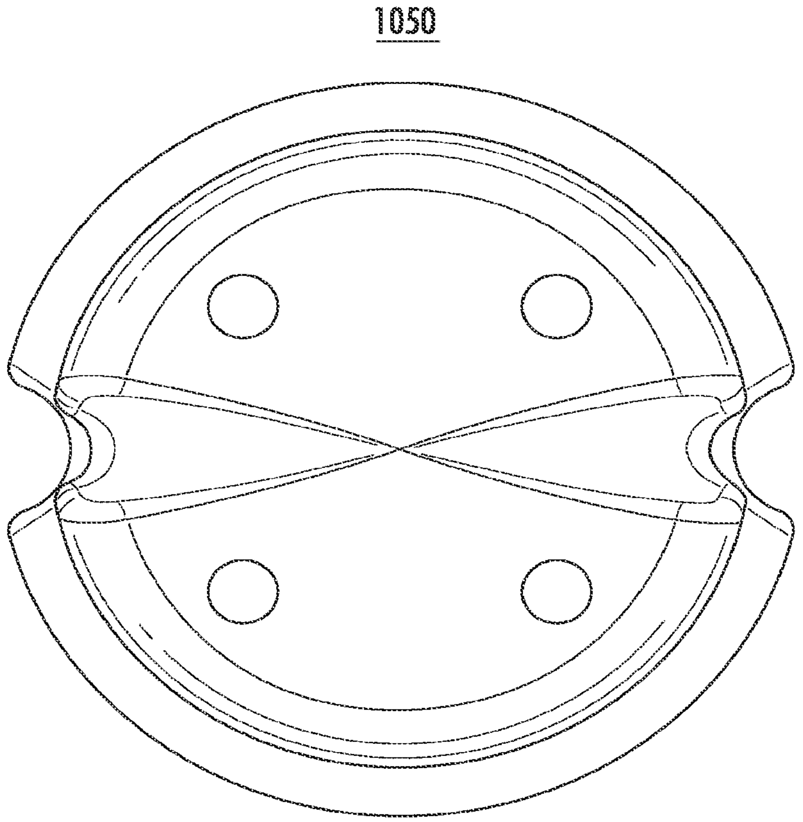
FIG. 58 illustrates a bottom view of the refill cartridge.

FIG. 58 illustrates a bottom view of refill cartridge 1050.

Figure 59:
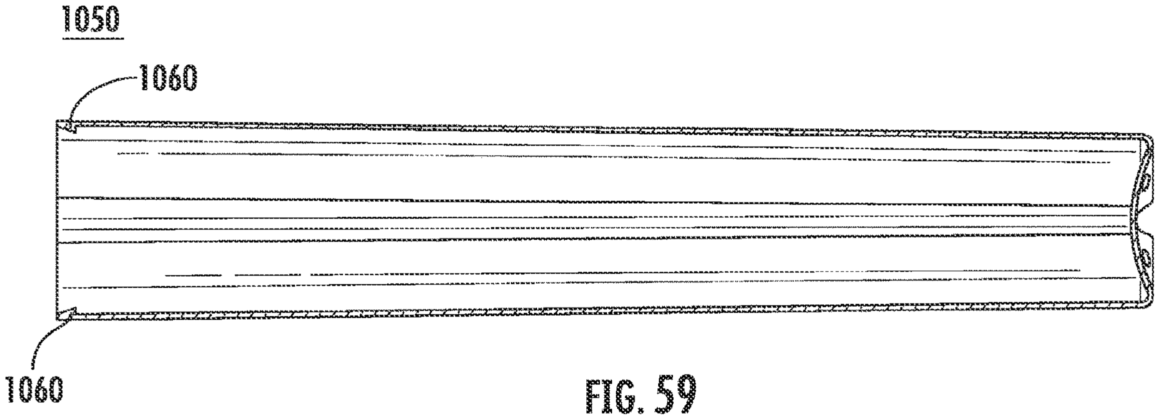
FIG. 59 is a cross-sectional view of the refill cartridge illustrating the nubs inside of the refill cartridge.

FIG. 59 is a cross-sectional view of refill cartridge 1050 illustrating nubs 1060 inside of refill cartridge 1050.

Figure 60:
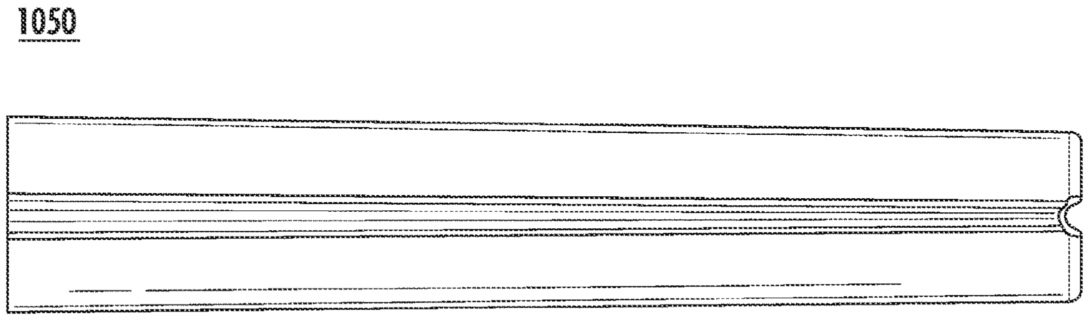
FIG. 60 is an external view of the refill cartridge.

FIG. 60 is an external view of refill cartridge 1050.

Figure 61:
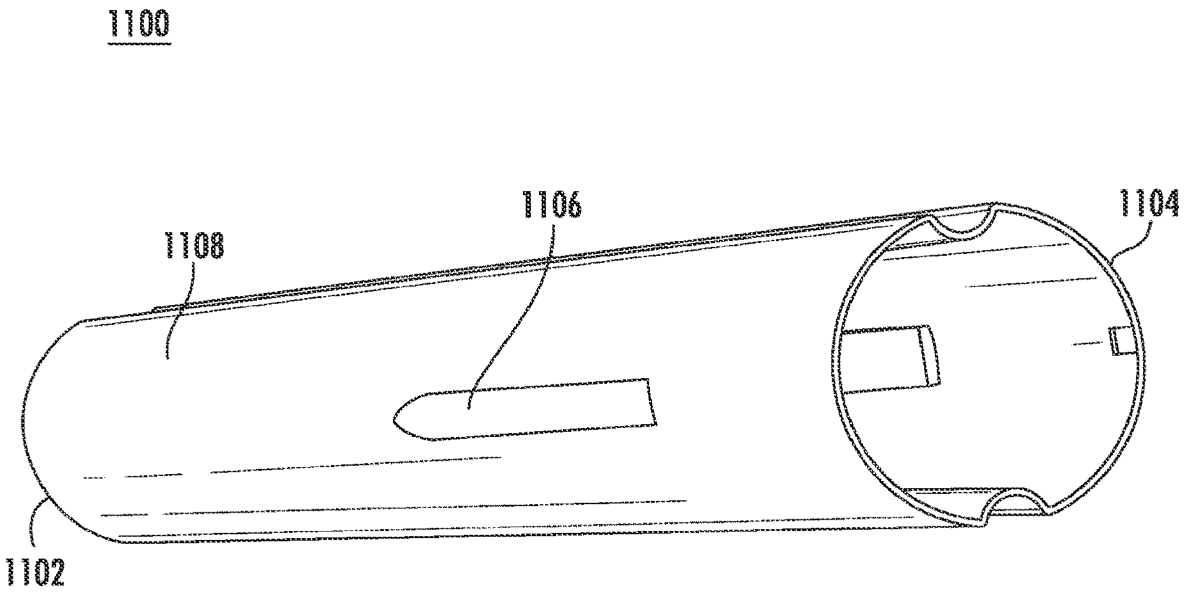
FIG. 61 is a perspective view of a "nestable" refill cartridge.

FIG. 61 is a perspective view of a "nestable" refill cartridge 1100. Refill cartridge 1100 is more tapered at a bottom end 1102 of refill cartridge 1100 than at an opposing top end 1104 of refill cartridge 1100. An indent 1106 is present on an external surface or side 1108 of refill cartridge 1100 that allows the refill cartridge nubs to slide down into and be received into another refill cartridge when more than one refill cartridge is nested together. The indents allow the nubs to slide down further when the refill cartridge is nested. The ability to nest is particularly beneficial for purposes of storage and transport of refill cartridges as they take up less space when bulk shipped.

Figure 62:
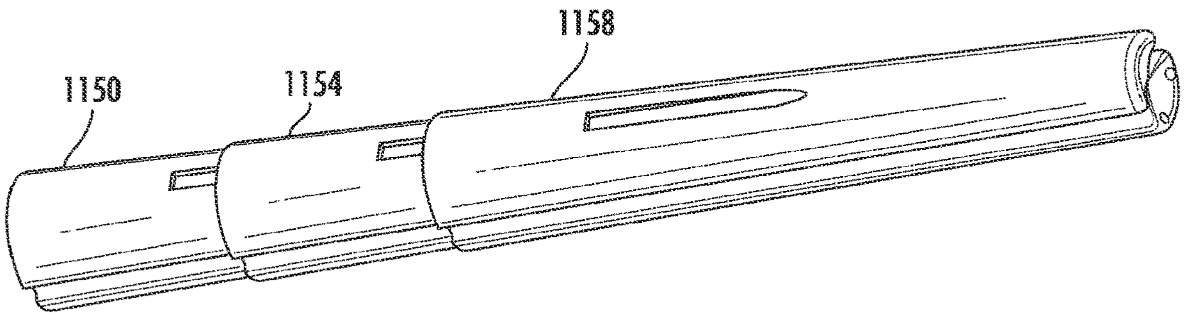
FIG. 62 is a perspective view of three nested refill cartridges.

FIG. 62 is a perspective view of three nested refill cartridges. Although refill cartridges 1150, 1154, and 1158 are shown, any number of refill cartridges may be nested.

Figure 63:
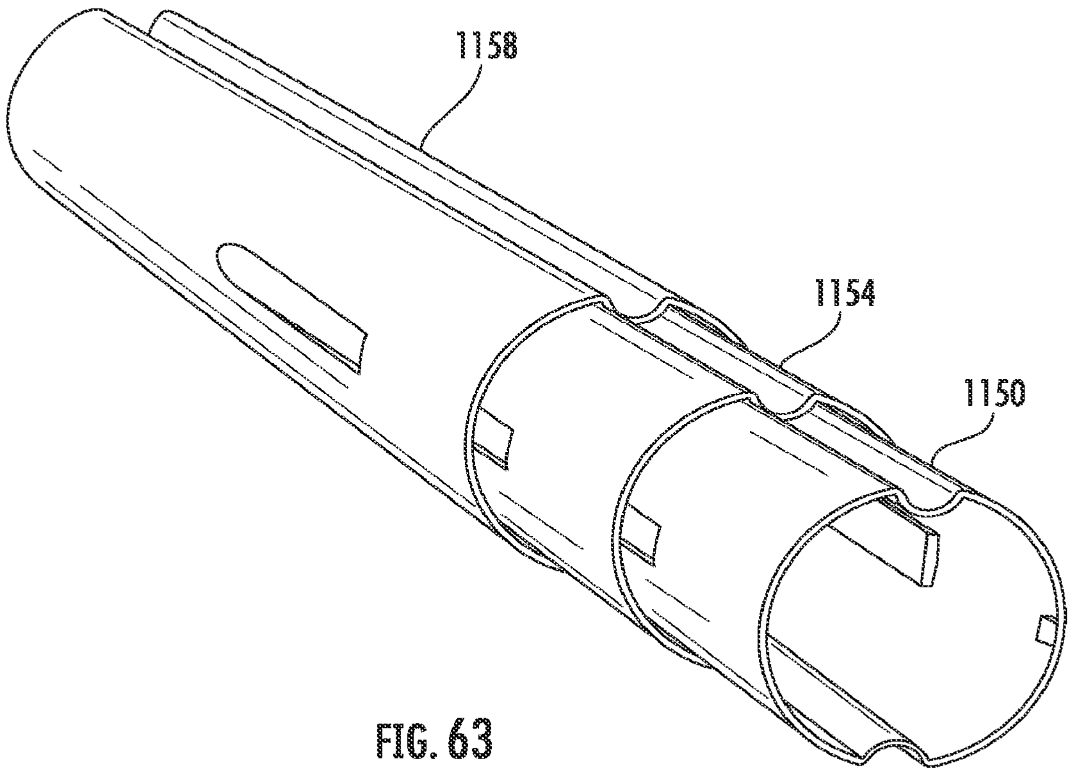
FIG. 63 is another perspective view of three nested refill cartridges.

FIG. 63 is another perspective view of nested refill cartridges 1150, 1154, and 1158 of FIG. 62.

Figure 64:
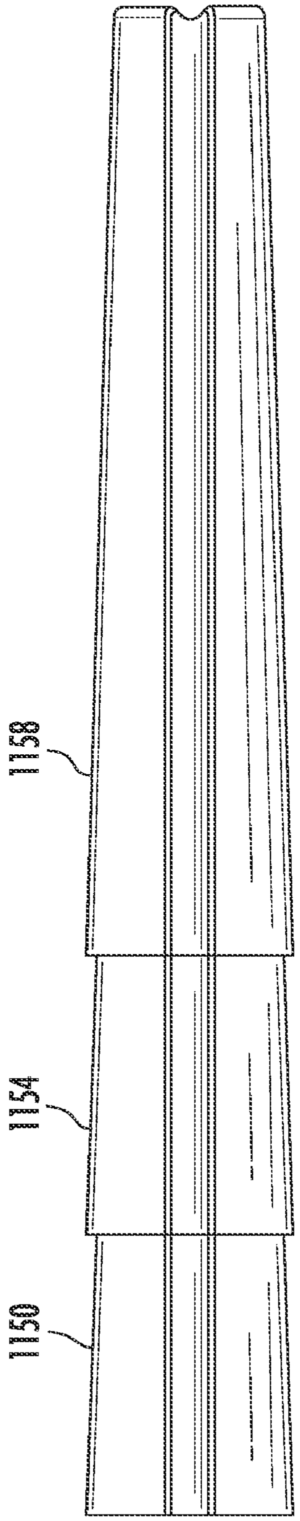
FIG. 64 is a side view of the three nested refill cartridges of FIG. 62.

FIG. 64 is a side view of the nested refill cartridges 1150, 1154, and 1158 of FIG. 62.

Figure 65:
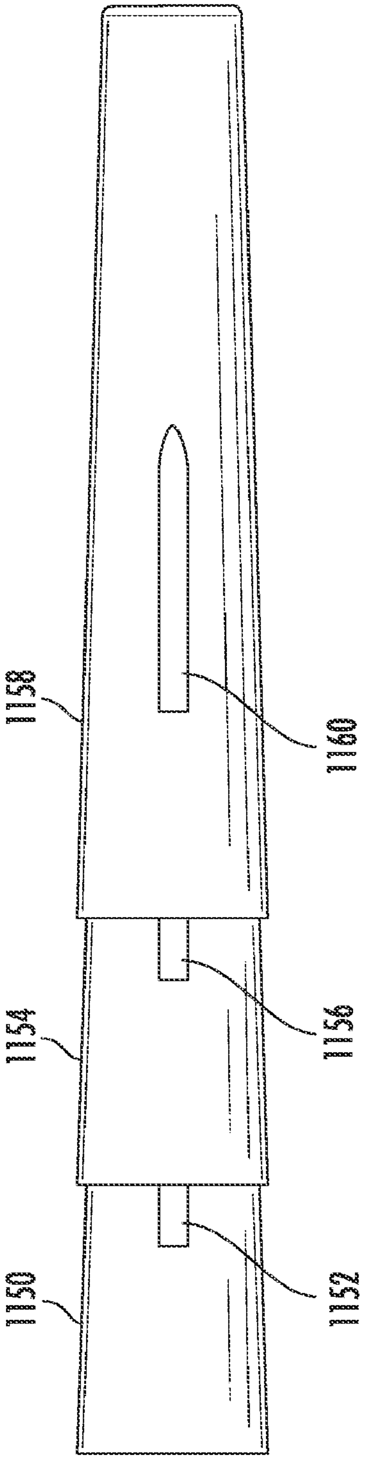
FIG. 65 is a view of the three nested refill cartridges of FIG. 64 rotated at an angle.

FIG. 65 is a view of nested refill cartridges 1150, 1154, and 1158 of FIG. 64 (rotated at an angle) showing indents 1152, 1156, and 1160, respectively, on external surfaces or sides of the refill cartridges 1150, 1154, and 1158.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A spray wand comprising:

a spray wand body having a hollow tube with a wand spray end, a refill cartridge assembly for insertion into the hollow tube, wherein the spray wand body is configured for receiving the refill cartridge assembly inside of the spray wand body, wherein the refill cartridge has one or more channels running along a length of the refill cartridge, a wand hose end having a handle connected to the spray wand body, wherein the refill cartridge assembly is comprised of a refill cartridge having a distal end and a proximal end and at least one nub within the refill cartridge at the proximal end, and a swirl chamber attached to the at least one nub on the proximal end of the refill cartridge, wherein the swirl chamber is configured to convert a single stream into several streams.

2. The spray wand according to claim 1, wherein the wand hose end has a wand hose end valve for control of water flow from a hose.

3. The spray wand according to claim 2, wherein the wand hose end valve comprises:

a housing having an interior space, an inlet for coupling the valve assembly with a fluid source, a first outlet directed to the input end of the main body, and a second outlet directed to the input end of the main body; and a valve core having a column rotatable within the interior space of the housing and a handle extending from the column, the valve core being at least rotatable to at least one closed position corresponding to a closed condition of the valve assembly, a first open position corresponding to a first open condition of the valve assembly from the inlet to the first outlet, and a second open position corresponding to a second open condition of the valve assembly from the inlet to the second outlet, wherein the valve core is rotatable at least partially around a rotational axis;

the column comprises:

a distal portion through which source fluid can enter from the inlet when the valve core is in the first open position and in the second open position;

a first output; and a second output, wherein the first output and the second output are offset relative to each other along the rotational axis.

4. The spray wand according to claim 1, wherein the refill cartridge is transparent.

5. The spray wand according to claim 1, further comprising a solid chemistry in the refill cartridge.

6. The spray wand according to claim 1, wherein one or more refill cartridges are connected together.

7. The spray wand according to claim 1, wherein one or more refill cartridges contain different solid chemistries.

8. The spray wand according to claim 1, wherein one or more refill cartridges contain same solid chemistries.

9. The spray wand according to claim 1, further comprising support pads in the handle of the wand hose end.

10. A refill cartridge assembly comprising:

a refill cartridge having a proximal end and a distal end, having at least one nub at the proximal end of the refill cartridge, and a swirl chamber attached to the at least one nub on the proximal end of the refill cartridge, wherein the distal end of the refill has at least two or more orifices or a screen, wherein the swirl chamber is configured to convert a single stream into several streams.

11. The refill cartridge assembly according to claim 10, wherein the swirl chamber is attached by being snapped onto the refill cartridge.

12. The refill cartridge assembly according to claim 10, further comprising a solid chemistry in the refill cartridge.

13. The refill cartridge assembly according to claim 10, wherein the refill cartridge is transparent.

14. The refill cartridge assembly according to claim 10, wherein the refill cartridge has a tubular body.

15. The refill cartridge assembly according to claim 10, wherein the refill cartridge is nestable with a second refill cartridge.

16. The refill cartridge assembly according to claim 10, wherein the refill cartridge has one or more channels on an exterior surface of the refill cartridge.

17. The refill cartridge assembly according to claim 10, wherein the refill cartridge has one or more indents on an exterior surface of the refill cartridge.

18. The refill cartridge assembly according to claim 10, wherein the swirl chamber comprises:

at least one open slot or channel on a back side of the swirl chamber, and one or more raised projections having fluid exit windows on a front side of the swirl chamber.

19. The refill cartridge assembly according to claim 18, wherein the one or more raised projections are ramps.

20. The refill cartridge assembly according to claim 18, wherein the fluid exit windows of the swirl chamber are in a geometric shape.

21. The refill cartridge assembly according to claim 20, wherein the geometric shape is rectangular, square, round, other geometric shape, and a combination thereof.

22. The refill cartridge assembly according to claim 18, wherein two open slots or channels are present on the back side of the swirl chamber.

23. The refill cartridge assembly according to claim 22, wherein spacing is present between the at least two open slots or channels.

24. The refill cartridge assembly according to claim 23, wherein the at least two open slots or channels are in a geometric shape.

25. The refill cartridge assembly according to claim 18, wherein the back side of the swirl chamber is configured for fluid entry into the back side of the swirl chamber in a linear fashion.

26. The refill cartridge assembly according to claim 18, wherein the swirl chamber creates a tumble of the fluid.

27. The refill cartridge assembly according to claim 18, wherein the swirl chamber causes a directional change in the fluid.

28. The refill cartridge assembly according to claim 18, wherein the front side of the swirl chamber is configured for fluid exit in a tangential manner.

* * * * *